US012627229B2

(12) United States Patent
Zhong et al.

(10) Patent No.: US 12,627,229 B2
(45) Date of Patent: May 12, 2026

(54) VOLTAGE BOOSTER INCLUDING CIRCUITRY TO REDUCE OVERVOLTAGE STRESS ON DISCHARGE PROTECTION DEVICE

(71) Applicant: QUALCOMM Incorporated, San Diego, CA (US)

(72) Inventors: Xiaopeng Zhong, San Diego, CA (US); Dinesh Jagannath Alladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 753 days.

(21) Appl. No.: 18/080,607

(22) Filed: Dec. 13, 2022

(65) Prior Publication Data

US 2024/0195297 A1     Jun. 13, 2024

(51) Int. Cl.
*H02M 3/155* (2006.01)
*H02M 1/08* (2006.01)
*H02M 1/32* (2007.01)
*H04B 1/40* (2015.01)

(52) U.S. Cl.
CPC ............. *H02M 3/155* (2013.01); *H02M 1/08* (2013.01); *H02M 1/32* (2013.01); *H04B 1/40* (2013.01)

(58) Field of Classification Search
CPC ............ H02M 1/08; H02M 1/32; H02M 3/07; H02M 3/155
USPC ......................................................... 455/73
See application file for complete search history.

(56) References Cited

U.S. PATENT DOCUMENTS

| | | | |
|---|---|---|---|
| 5,703,827 A | * | 12/1997 | Leung .................... G11C 5/146 365/189.11 |
| 6,493,243 B1 | | 12/2002 | Real |
| 8,139,329 B2 | | 3/2012 | Martin |
| 9,171,834 B2 | | 10/2015 | Tang et al. |
| 9,635,719 B2 | | 4/2017 | Knoedgen et al. |
| 9,685,502 B2 | | 6/2017 | Wood |
| 10,181,719 B2 | | 1/2019 | Coyne |

(Continued)

FOREIGN PATENT DOCUMENTS

JP        2007267537 A        10/2007

OTHER PUBLICATIONS

International Search Report and Written Opinion—PCT/US2023/080041—ISA/EPO—Mar. 13, 2024.

(Continued)

*Primary Examiner* — Ajibola A Akinyemi
(74) *Attorney, Agent, or Firm* — Loza & Loza, LLP

(57) ABSTRACT

An apparatus including: a boost voltage generator configured to generate a boost voltage at an output; a first field effect transistor (FET) including a drain/source terminal coupled to the output of the boost voltage generator; a discharging circuit coupled to a source/drain terminal of the first FET, wherein the discharging circuit is configured to discharge the output of the boost voltage generator via the first FET in response to an asserted discharging signal; and a gate voltage boost circuit configured to generate a gate voltage for a gate of the first FET, wherein the gate voltage boost circuit is configured to boost the gate voltage in response to the asserted discharging signal. Another implementation may include a current injection circuit configured to generate and inject a current into the discharging circuit in lieu of or in addition to the gate voltage boost circuit.

30 Claims, 8 Drawing Sheets

(56) References Cited

U.S. PATENT DOCUMENTS

| | | |
|---|---|---|
| 10,454,360 B1 | 10/2019 | Dashtestani et al. |
| 10,469,066 B1 | 11/2019 | Shankar |
| 10,862,323 B2 | 12/2020 | Banos et al. |
| 2003/0197425 A1 | 10/2003 | Montante |
| 2019/0199093 A1 | 6/2019 | Cheng et al. |
| 2019/0372569 A1* | 12/2019 | Davila ................. H03K 17/165 |

OTHER PUBLICATIONS

International Search Report and Written Opinion—PCT/US2023/080041—ISA/EPO—May 14, 2024.

* cited by examiner

1300

1310

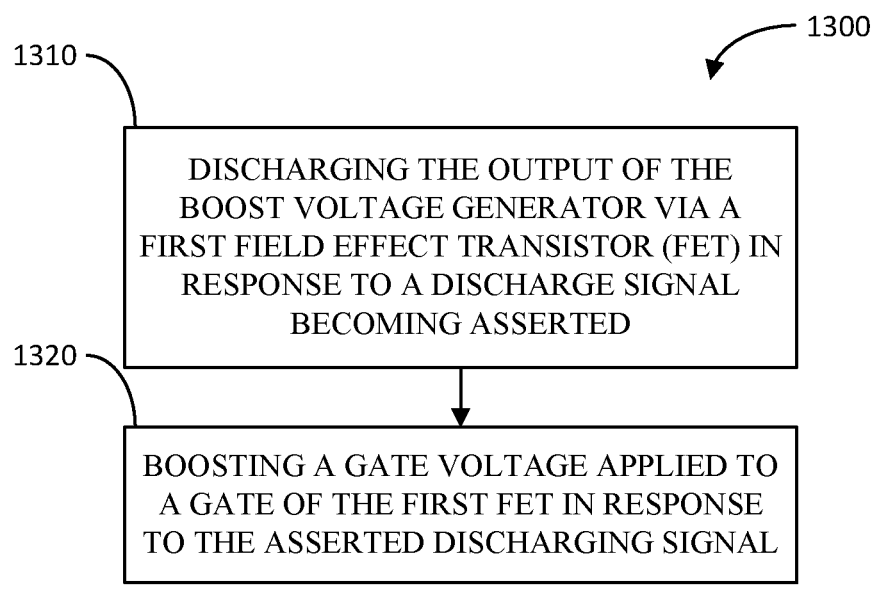

DISCHARGING THE OUTPUT OF THE BOOST VOLTAGE GENERATOR VIA A FIRST FIELD EFFECT TRANSISTOR (FET) IN RESPONSE TO A DISCHARGE SIGNAL BECOMING ASSERTED

1320

BOOSTING A GATE VOLTAGE APPLIED TO A GATE OF THE FIRST FET IN RESPONSE TO THE ASSERTED DISCHARGING SIGNAL

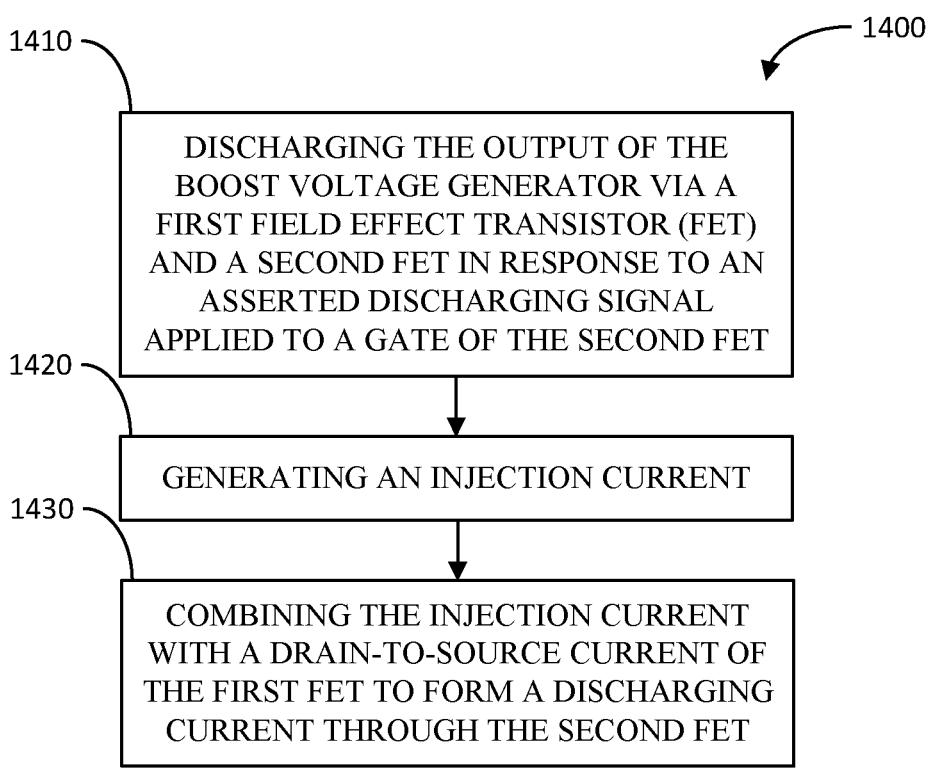

DISCHARGING THE OUTPUT OF THE BOOST VOLTAGE GENERATOR VIA A FIRST FIELD EFFECT TRANSISTOR (FET) AND A SECOND FET IN RESPONSE TO AN ASSERTED DISCHARGING SIGNAL APPLIED TO A GATE OF THE SECOND FET

1420

GENERATING AN INJECTION CURRENT

1430

COMBINING THE INJECTION CURRENT WITH A DRAIN-TO-SOURCE CURRENT OF THE FIRST FET TO FORM A DISCHARGING CURRENT THROUGH THE SECOND FET

FIG. 14

VOLTAGE BOOSTER INCLUDING CIRCUITRY TO REDUCE OVERVOLTAGE STRESS ON DISCHARGE PROTECTION DEVICE

FIELD

Aspects of the present disclosure relate generally to integrated circuits (ICs) including voltage boosters, and in particular, to a voltage booster including circuitry to reducing overvoltage stress on discharge protection device.

BACKGROUND

An integrated circuit (IC) may include a voltage booster to generate a boost voltage above an input voltage, such as a supply voltage on a voltage rail Vdd used by the voltage booster. For example, if the supply voltage is 0.9 Volt (V), a voltage booster may generate a boost voltage to be somewhere between 0.9V and 1.8V. To keep devices, such as field effect transistors (FETs), small for processing speed and IC footprint considerations, often the devices are implemented to have a maximum voltage rating above the supply voltage Vdd by a tolerance margin (e.g., 1.2V, where 0.9V is Vdd, and 0.3V is the tolerance margin). A boost voltage twice as high as the supply voltage Vdd may be above the voltage rating of such devices. Thus, it is of interest to protect such devices from overvoltage stress due to the boost voltage.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

An aspect of the disclosure relates to an apparatus. The apparatus includes a boost voltage generator configured to generate a boost voltage at an output; a first field effect transistor (FET) including a drain/source terminal coupled to the output of the boost voltage generator; a discharging circuit coupled to a source/drain terminal of the first FET, wherein the discharging circuit is configured to discharge the output of the boost voltage generator via the first FET in response to a discharging signal becoming asserted; and a gate voltage boost circuit configured to generate a gate voltage for a gate of the first FET, wherein the gate voltage boost circuit is configured to boost the gate voltage in response to the asserted discharging signal.

Another aspect of the disclosure relates to a method of reducing a boost voltage at an output of a boost voltage generator. The method includes discharging the output of the boost voltage generator via a first field effect transistor (FET) in response to a discharge signal becoming asserted; and boosting a gate voltage applied to a gate of the first FET in response to the asserted discharging signal.

Another aspect of the disclosure relates to an apparatus, comprising: a boost voltage generator configured to generate a boost voltage at an output; a first field effect transistor (FET) including a drain/source terminal coupled to the output of the boost voltage generator; a discharging circuit coupled to a source/drain terminal of the first FET, wherein the discharging circuit is configured to discharge the output of the boost voltage generator via the first FET in response to a discharging signal becoming asserted; and a current injection circuit configured to generate and inject a current into the discharging circuit.

Another aspect of the disclosure relates to a method of reducing a boost voltage at an output of a boost voltage generator. The method includes discharging the output of the boost voltage generator via a first field effect transistor (FET) and a second FET in response to an asserted discharging signal applied to a gate of the second FET; generating an injection current; and combining the injection current with a drain-to-source current of the first FET to form a discharging current through the second FET.

Another aspect of the disclosure relates to a wireless communication device. The wireless communication device includes: at least one antenna; a transceiver coupled to the at least one antenna, wherein the transceiver includes: a voltage booster, including: a boost voltage generator configured to generate a boost voltage at an output, a first field effect transistor (FET) including a drain/source terminal coupled to the output of the boost voltage generator, a discharging circuit coupled to a source/drain terminal of the first FET, wherein the discharging circuit is configured to discharge the output of the boost voltage generator via the first FET in response to a discharging signal becoming asserted, and a gate voltage boost circuit configured to generate a gate voltage for a gate of the first FET, wherein the gate voltage boost circuit is configured to generate the gate voltage at a boosted level in response to the asserted discharging signal; and an analog-to-digital converter (ADC) configured to use the boost voltage; and an integrated circuit (IC) including one or more signal processing cores coupled to the transceiver.

Another aspect of the disclosure relates to a wireless communication device. The wireless communication device includes: at least one antenna; a transceiver coupled to the at least one antenna, wherein the transceiver includes: a voltage booster, including: a boost voltage generator configured to generate a boost voltage at an output, a first field effect transistor (FET) including a drain/source terminal coupled to the output of the boost voltage generator, a discharging circuit coupled to a source/drain terminal of the first FET, wherein the discharging circuit is configured to discharge the output of the boost voltage generator via the first FET in response to a discharging signal becoming asserted, and a current injection circuit configured to generate and inject a current into the discharging circuit; and an analog-to-digital converter (ADC) configured to use the boost voltage; and an integrated circuit (IC) including one or more signal processing cores coupled to the transceiver.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the description implementations are intended to include all such aspects and their equivalents.

BRIEF DESCRIPTION OF THE DRAWINGS

FIG. 13 illustrates a flow diagram of an example method of reducing a boost voltage at an output of a boost voltage generator in accordance with another aspect of the disclosure.

FIG. 14 illustrates a flow diagram of another example method of reducing a boost voltage at an output of a boost voltage generator in accordance with another aspect of the disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
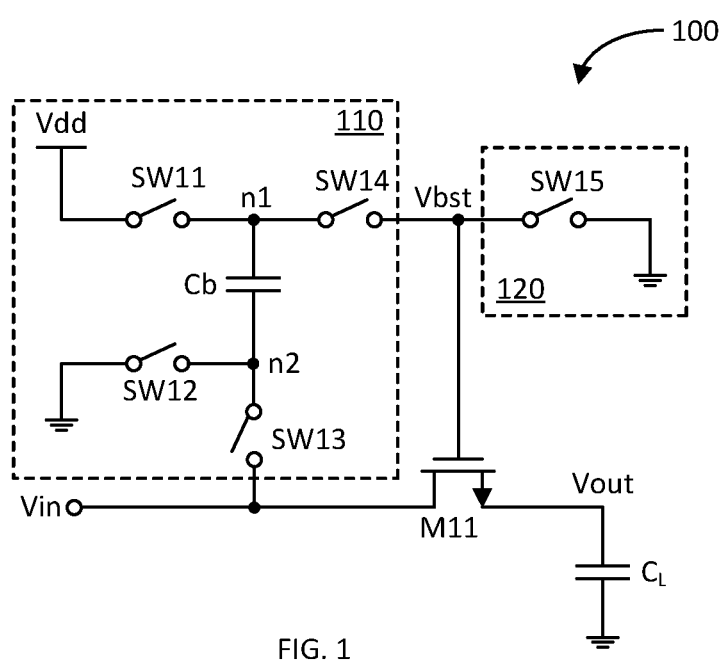
FIG. 1 illustrates a schematic diagram of an example voltage booster in accordance with an aspect of the disclosure.

FIG. 1 illustrates a schematic diagram of an example voltage booster 100 in accordance with an aspect of the disclosure. In this example, the voltage booster 100 may be implemented as a switched-capacitor bootstrapped voltage booster. As discussed further herein, a switched-capacitor bootstrapped voltage booster generates a boost voltage being a sum of a supply voltage Vdd and an input voltage Vin, where Vin may vary, for example, between 0V and Vdd. The voltage booster 100 may also be implemented in an integrated circuit (IC).

The voltage booster 100 may be configured to generate a boost voltage Vbst based on an input voltage Vin, wherein the boost voltage Vbst is substantially equal to a sum of an upper supply voltage rail Vdd and the input voltage Vin. The boost voltage Vbst is applied to a gate of a field effect transistor (FET) to turn on the FET to pass the input voltage Vin to a load. The voltage booster 100 includes a discharging circuit to reset or reduce the gate voltage of the FET to zero (0) Volt (V) or some other voltage level for preparation of a subsequent cycle for turning on the FET.

In particular, the voltage booster 100 includes a boost voltage generator or charging circuit 110, a discharging circuit 120, a FET M11 (which may be implemented as an n-channel metal oxide semiconductor FET (NMOS FET)), and a load represented as a capacitive load $C_L$.

The boost voltage generator 110 includes a set of switching devices SW11, SW12, SW13, and SW14, and a boost capacitor Cb. The switching device SW11 is coupled between an upper voltage rail Vdd and a node n1. The boost capacitor Cb is coupled between node n1 and a node n2. The switching device SW12 is coupled between node n2 and a lower voltage rail (e.g., ground). The switching device SW13 is coupled between node n2 and an input configured to receive the input voltage Vin. The switching device SW14 is coupled between node n1 and a gate of FET M11.

The discharging circuit 120 includes a switching device SW15 coupled between the gate of the FET M11 and the lower voltage rail. The FET M11 includes a drain coupled to the Vin input and a source coupled to an output at which an output voltage Vout is produced. The load $C_L$ is coupled between the output and the lower voltage rail.

The voltage booster 100 may be operated in accordance with two phases. The two phases may be cycled or repeated. In a first phase, the boost capacitor Cb is charged to have a potential of Vdd across the capacitor Cb, while the gate of the FET M11 is coupled to the lower voltage rail; and in a second phase, a boost voltage Vbst is produced at the gate of the FET M11 to turn on the FET M11 and allow the input voltage Vin to pass through to form the output voltage Vout across the load $C_L$.

More specifically, in the first phase, the switching devices SW11, SW12, and SW15 are closed, and the switching devices SW13 and SW14 are open. The closed switching device SW11 couples the upper voltage rail Vdd to a first terminal (at node n1) of the boost capacitor Cb, and the closed switching device SW12 couples a second terminal (at node n2) of the boost capacitor Cb to the lower voltage rail. Assuming the voltage at the upper voltage rail may also be referred to as Vdd, and the voltage or potential at the lower voltage rail is zero (0) V or ground, the boost capacitor Cb is charged to a potential of substantially Vdd. The closed switching device SW15 couples the gate of M11 to ground to discharge any residual boost voltage Vbst from a previous cycle, and turn off the FET M11 during the first phase. The open switching devices SW13 and SW14 isolate the Vin input and gate of the FET M11 from the boost voltage generator 110 during the first phase, respectively.

During the second phase, the switching devices SW11, SW12, and SW15 are open, and the switching devices SW13 and SW14 are closed. The closed switching device SW13 applies the input voltage Vin to the second terminal (at node n2) of the boost capacitor Cb, and the closed switching device SW14 couples the first terminal of the boost capacitor Cb to the gate of the FET M11. In this configuration, the boost voltage Vbst produced at the gate of the FET M11 is substantially equal to Vdd+Vin. The open switching devices SW11 and SW12 isolate the boost capacitor Cb from the upper and lower voltage rails, respectively, and the open switching device SW15 isolates the gate of FET M11 from the lower voltage rail. The boost voltage Vbst at the gate of FET M11 turns on the FET M11 with a gate-to-source voltage (Vgs) of substantially Vdd. The turned-on FET M11 passes the input voltage Vin to the output to form the output voltage Vout (being substantially equal to the input voltage Vin) across the load $C_L$.

As discussed above, the voltage booster 100 may be implemented in an IC. In such implementation, the switching devices SW11 to SW15 may be implemented as FETs. Typically, such FETs SW11 to SW15 are designed to reliably operate with a maximum voltage across any two terminals of Vdd. For example, each of the FETs SW11 to SW15 may have a reliability limit above Vdd by a tolerance margin. For instance, if Vdd is 0.9V, for example, the reliability limit of such FETs SW11 to SW15 may be 1.2V. However, the input voltage Vin may be as high as Vdd. And, as discussed, the boost voltage Vbst may be as high as Vdd+Vin or 2Vdd. As illustrated, the boost voltage Vbst is across the FET SW15 of the discharging circuit 120. Accordingly, the FET SW15 may be subjected to overvoltage stress (e.g., a voltage above its reliability limit) when the input voltage Vin is significantly high (e.g., Vin>0.4Vdd).

Figure 2:
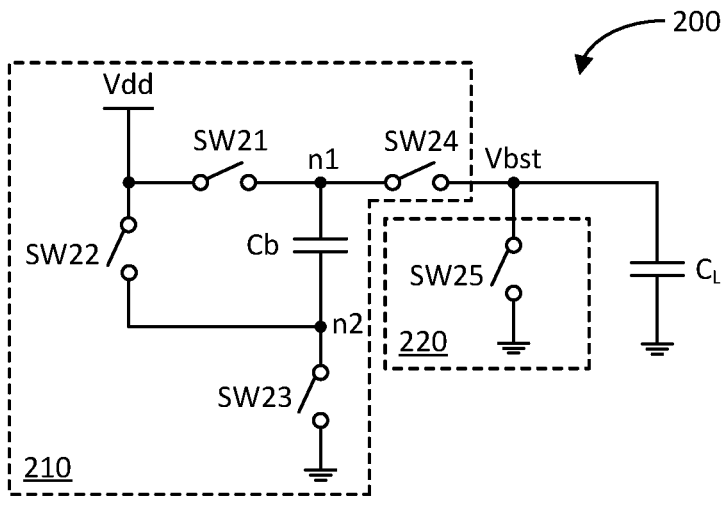
FIG. 2 illustrates a schematic diagram of another example voltage booster in accordance with another aspect of the disclosure.

FIG. 2 illustrates a schematic diagram of another example voltage booster 200 in accordance with another aspect of the disclosure. In this example, the voltage booster 200 is implemented as a charge pump voltage booster. As discussed further herein, a charge pump voltage booster generates a boost voltage Vbst at substantially twice the supply voltage Vdd (e.g., the input voltage is the supply voltage Vdd for the voltage booster 200). The boost voltage Vbst is applied across a load. The voltage booster 200 also includes a discharging circuit to reset or reduce the voltage across the load for preparation of a subsequent cycle for generating and applying the boost voltage Vbst across the load. Similarly, the voltage booster 200 may be implemented in an integrated circuit (IC).

In particular, the voltage booster 200 includes a boost voltage generator or charging circuit 210, a discharging circuit 220, and a load represented as a capacitive load $C_L$. The boost voltage generator 210 includes a set of switching devices SW21, SW22, SW23, and SW24, and a boost capacitor Cb. The switching device SW21 is coupled between an upper voltage rail Vdd and a node n1. The boost capacitor Cb is coupled between node n1 and a node n2. The switching device SW22 is coupled between the upper voltage rail Vdd and node n2. The switching device SW23 is coupled between node n2 and a lower voltage rail (e.g., ground). The switching device SW24 is coupled between node n1 and the load $C_L$. The discharging circuit 220 includes a switching device SW25 coupled across or in parallel with the load $C_L$.

The voltage booster 200 may be operated in accordance with two phases. The two phases may be cycled or repeated. In a first phase, the boost capacitor Cb is charged to have a potential of Vdd across the capacitor Cb, while the discharging circuit 220 applies a short across the load $C_L$; and in a second phase, a boost voltage Vbst is produced across the load $C_L$.

More specifically, in the first phase, the switching devices SW21, SW23, and SW25 are closed, and the switching devices SW22 and SW24 are open. The closed switching device SW21 couples the upper voltage rail Vdd to a first terminal (at node n1) of the boost capacitor Cb, and the closed switching device SW23 couples a second terminal (at node n2) of the boost capacitor Cb to the lower voltage rail. Assuming the voltage at the upper voltage rail may also be referred to as Vdd, and the voltage or potential at the lower voltage rail is zero (0) V or ground, the boost capacitor Cb is charged to a potential of substantially Vdd. The closed switching device SW25 applies a short across the load $C_L$ to reduce any residual boost voltage Vbst from a previous cycle to ground.

During the second phase, the switching devices SW21, SW23, and SW25 are open, and the switching devices SW22 and SW24 are closed. The closed switching device SW22 applies Vdd to the second terminal (at node n2) of the boost capacitor Cb, and the closed switching device SW24 couples the first terminal of the boost capacitor Cb to the load $C_L$. In this configuration, the boost voltage Vbst produced across the load $C_L$ is substantially equal to 2Vdd. The open switching devices SW21 and SW23 isolate the boost capacitor Cb from the upper and lower voltage rails, respectively, and the open switching device SW25 removes the short across the load $C_L$.

As discussed above, the voltage booster 200 may also be implemented in an IC, where the switching devices SW21 to SW25 are implemented as FETs. Similarly, such FETs SW21 to SW25 may be designed to reliably operate with a maximum voltage across any two terminals of Vdd with a reliability limit above Vdd by a tolerance margin. However, as discussed, the boost voltage Vbst may be substantially equal to 2Vdd. As illustrated, the boost voltage Vbst is across the FET SW25 of the discharging circuit 220. Accordingly, the FET SW25 may be subjected to overvoltage stress (e.g., a voltage above its reliability limit) due to the boost voltage Vbst being substantially equal to 2Vdd.

Figure 3:
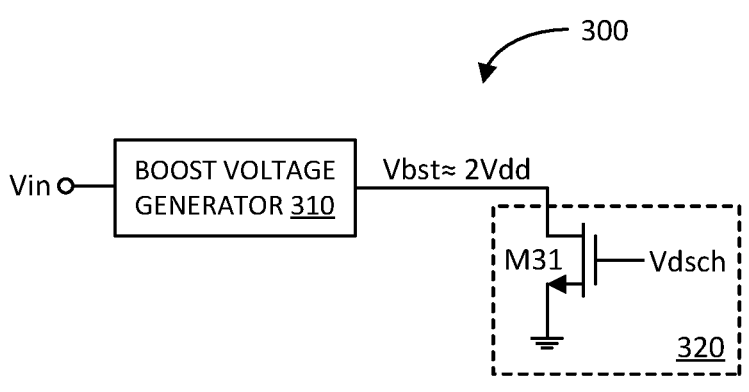
FIG. 3 illustrates a schematic/block diagram of another example voltage booster in accordance with another aspect of the disclosure.

FIG. 3 illustrates a schematic/block diagram of another example voltage booster 300 in accordance with another aspect of the disclosure. The voltage booster 300 includes a boost voltage generator 310 and a discharging circuit 320. The boost voltage generator 310 is configured to generate and output a boost voltage Vbst based on an input voltage Vin, wherein the boost voltage Vbst may be as high as 2Vdd. For example, if the boost voltage generator 310 is implemented per the bootstrapped switch boost voltage generator 110, the boost voltage Vbst may be substantially equal to Vdd+Vin, where Vin may be as high as Vdd. If the boost voltage generator 310 is implemented per the charge pump boost voltage generator 210, the boost voltage Vbst may be substantially equal to 2Vdd. It shall be understood that the boost voltage generator 310 may be implemented as other types of boost voltage generator.

The discharging circuit 320 includes a FET M31 (e.g., an NMOS FET) including: a drain coupled to an output of the boost voltage generator 310 to receive therefrom the boost voltage Vbst; a source coupled to a lower voltage rail (e.g., ground); and a gate configured to receive an asserted discharging signal Vdsch to turn on the FET M31 during a second operating phase. As discussed with reference to voltage boosters 100 and 200, the FET M31 may be subjected to overvoltage stress due to the boost voltage Vbst.

Figure 4:
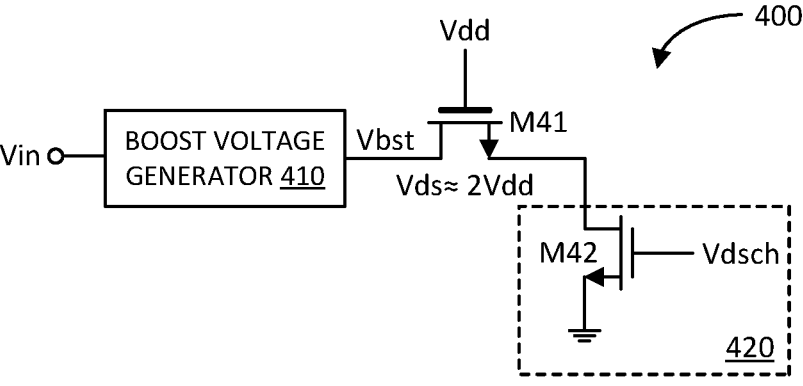
FIG. 4 illustrates a schematic/block diagram of another example voltage booster in accordance with another aspect of the disclosure.

FIG. 4 illustrates a schematic/block diagram of another example voltage booster 400 in accordance with another aspect of the disclosure. The voltage booster 400 is similar to voltage booster 300 previously discussed, but includes an overvoltage protection device to prevent overvoltage stress of the discharging circuit.

In particular, the voltage booster 400 includes a boost voltage generator 410, an overvoltage protection field effect transistor (FET) M41, and a discharging circuit 420. The boost voltage generator 410 is configured to generate and output a boost voltage Vbst based on an input voltage Vin, wherein the boost voltage Vbst may be as high as 2Vdd. The overvoltage protection FET M41 (e.g., an NMOS FET) includes a drain coupled to an output of the boost voltage generator 410 (at which the boost voltage Vbst is produced), a source coupled to the discharging circuit 420, and a gate configured to receive the supply voltage at an upper voltage rail Vdd.

The discharging circuit 420 includes a FET M42 (e.g., an NMOS FET) including: a drain coupled to the source of the overvoltage protection FET M41; a source coupled to a lower voltage rail (e.g., ground); and a gate configured to receive a discharging signal Vdsch. During a first operating phase, the discharging signal Vdsch is asserted to turn on the FET M42 to reduce the boost voltage Vbst by discharging the output of the boost voltage generator 410 to ground via the overvoltage protection FET M41. The FET M42 being turned on causes the overvoltage protection FET M41 to likewise turn on as its gate-to-source voltage Vgs is substantially Vdd, which could be above its threshold voltage Vth. During a second operating phase, the discharging signal Vdsch is deasserted to turn off the FET M42, while the boost voltage generator 410 outputs the boost voltage Vbst for its intended use (e.g., for turning on a FET or providing the boost voltage Vbst to a load).

As represented by a thick gate line, the overvoltage protection FET M41 may be implemented with a thicker gate oxide compared to the gate oxide of the FET M42 of the discharging circuit 420. The thicker gate oxide FET M41 allows voltage across it to be as high as 2Vdd (e.g., its drain-to-source voltage Vds may be as high as 2Vdd) without being subjected to overvoltage stress (e.g., due to the thicker oxide, its reliability limit may be above 2Vdd). Thus, the FET M42 of the discharging circuit 420 is not subjected to overvoltage stress because the boost voltage Vbst is mostly across the overvoltage protection FET M41.

One drawback with this approach is that the overvoltage protection FET M41 is implemented with a gate oxide thicker than the gate oxide of FET M42. As the overvoltage protection FET M41 is different than FET M42, additional process steps (e.g., a different set of masks) should be implemented to form the thicker gate oxide FET M41. This complicates the fabrication of the IC. Furthermore, in certain technology nodes, the formation of such thicker gate oxide FET M41 may not be available or feasible. Thus, it would be desirable to implement the overvoltage protection FET in the same manner (e.g., same gate oxide thickness) as FET M42 of the discharging circuit 420.

Figure 5:
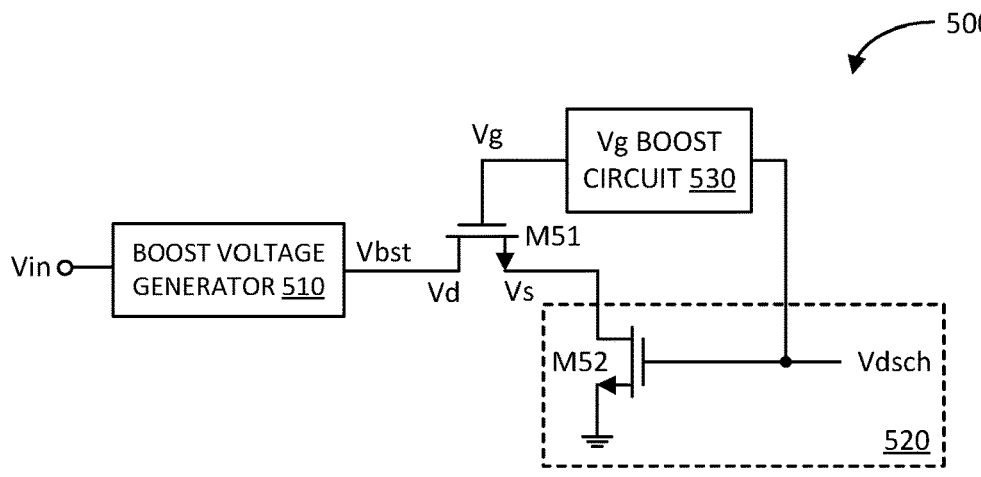
FIG. 5 illustrates a schematic/block diagram of another example voltage booster in accordance with another aspect of the disclosure.

FIG. 5 illustrates a schematic/block diagram of another example voltage booster 500 in accordance with another aspect of the disclosure. As discussed in more detail herein, the voltage booster 500 includes a gate voltage boost circuit configured to generate a boosted gate voltage for an overvoltage protection field effect transistor (FET) in response to an asserted discharging signal Vdsch. The boosted gate voltage ensures that the voltages across any two terminals of the overvoltage protection field effect transistor (FET) do not overvoltage stress the FET. In doing so, the overvoltage protection FET need not be implemented with a thicker oxide, and may be implemented with a thinner oxide in accordance with other FETs in an integrated circuit (IC), such as the FET of a discharging circuit.

In particular, the voltage booster 500 includes a boost voltage generator 510, an overvoltage protection FET M51, a discharging circuit 520, and a gate voltage boost circuit 530. The boost voltage generator 510 is configured to generate a boost voltage Vbst based on an input voltage Vin, wherein the boost voltage Vbst may be as high as 2Vdd. The overvoltage protection FET M51 (e.g., an NMOS FET) includes a drain coupled to an output of the boost voltage generator 510 (at which the boost voltage Vbst is produced), a source coupled to the discharging circuit 520, and a gate configured to receive a gate voltage Vg.

The discharging circuit 520 includes a FET M52 (e.g., an NMOS FET) including a drain coupled to the source of the overvoltage protection FET M51, a source coupled to a lower voltage rail (e.g., ground), and a gate configured to receive a discharging signal Vdsch. The gate voltage boost circuit 530 includes an input configured to receive the discharging signal Vdsch, and is configured to generate a boosted gate voltage Vg for the overvoltage protection FET M51 in response to the discharging signal Vdsch becoming asserted. When the discharging signal Vdsch is not asserted, the gate voltage boost circuit 530 may be configured to generate the gate voltage Vg at a non-boosted voltage level (e.g., Vdd).

During a first operating phase, the discharging signal Vdsch is asserted to turn on the FET M52 to discharge the output of the boost voltage generator 510 to ground via the overvoltage protection FET M51 so that the boosted voltage Vbst is reduced to, for example, 0V. Also, in response to the asserted discharging signal Vdsch, the gate voltage boost circuit 530 boosts the gate voltage Vg for the overvoltage protection FET M51 so that the voltage across any two of its terminals is at or below a threshold (e.g., at or below Vdd).

For example, the gate voltage boost circuit 530 may raise the gate voltage Vg from Vdd to 2Vdd. In the initial discharging phase (the time overvoltage stress happens), the discharging current can be considered relatively constant. No matter whether the discharging current is constant or not, given a certain discharging current, the source voltage Vs of the overvoltage protection FET M51 also exhibits a similar voltage increase t when the gate voltage Vg is boosted. If the boost voltage Vbst, which is also the drain voltage Vd of the overvoltage protection FET M51, is at 2Vdd, then the voltage difference between any two terminals is not greater than Vdd. For example, if Vd is at 2Vdd, Vg is at 2Vdd, and Vs is at Vdd, then: the gate-to-drain voltage Vgd of the overvoltage protection FET M51 is substantially 0V (e.g., Vg−Vd=2Vdd−2Vdd=0V); the gate-to-source voltage Vgs of the overvoltage protection FET M51 is substantially Vdd (e.g., Vg−Vs=2Vdd−Vdd=Vdd); and the drain-to-source voltage Vds of the overvoltage protection FET M51 is substantially Vdd (e.g., Vd−Vs=2Vdd−Vdd=Vdd). In such case, the overvoltage protection FET M51 is not subject to overvoltage stress.

During a second operating phase, the discharging signal Vdsch is not asserted (deasserted) to turn off the FET M52 so that the boost voltage Vbst generated by the boost voltage generator 510 may be used in accordance with its intended purpose (e.g., to provide the boost voltage Vbst to a load $C_L$ or turn on a FET (e.g., FET M11)). In response to the deasserted discharging signal Vdsch, the gate voltage boost circuit 530 decreases the gate voltage Vg to its non-boosted level (e.g., at Vdd).

Figure 6A:
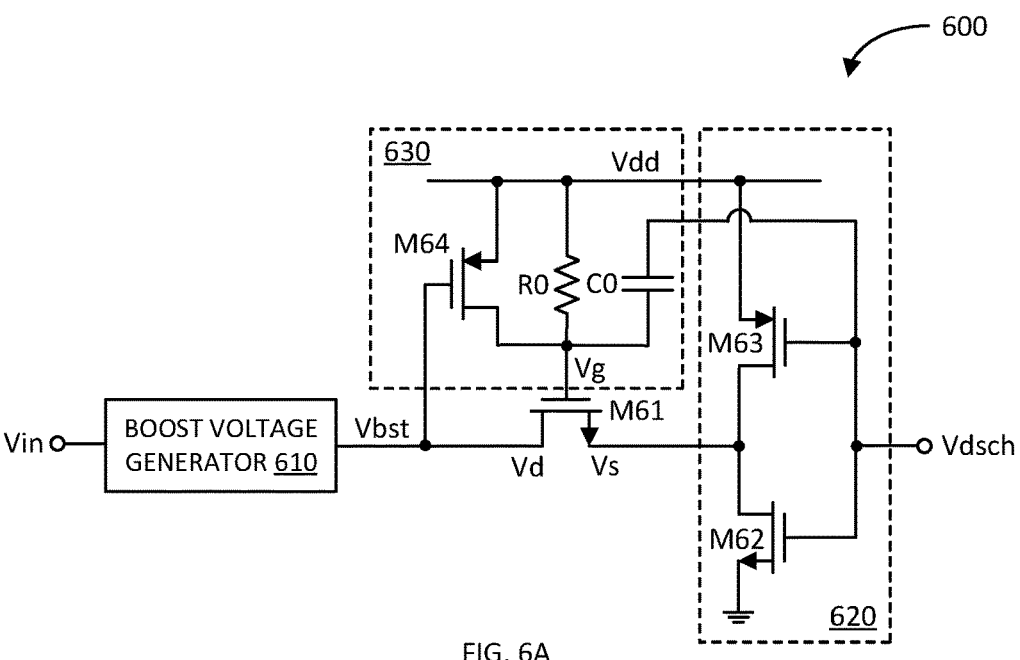
FIG. 6A illustrates a schematic/block diagram of another example voltage booster in accordance with another aspect of the disclosure.

FIG. 6A illustrates a schematic/block diagram of another example voltage booster 600 in accordance with another aspect of the disclosure. The voltage booster 600 may be an example more detailed implementation of the voltage booster 500. In particular, the voltage booster 600 includes a boost voltage generator 610, an overvoltage protection field effect transistor (FET) M61, a discharging circuit 620, and a gate voltage boost circuit 630.

The boost voltage generator 610 is configured to generate a boost voltage Vbst based on an input voltage Vin, wherein the boost voltage Vbst may be as high as 2Vdd. The overvoltage protection FET M61 (e.g., an NMOS FET) includes a drain coupled to an output of the boost voltage generator 610 (at which the boost voltage Vbst is produced), a source coupled to the discharging circuit 620, and a gate configured to receive a gate voltage Vg. The discharging circuit 620 includes a FET M63 (e.g., a p-channel metal oxide semiconductor FET (PMOS FET)) coupled in series with a FET M62 (e.g., an NMOS FET) between an upper voltage rail Vdd and a lower voltage rail (e.g., ground). That is, the FET M63 includes a source coupled to the upper voltage rail Vdd, a gate configured to receive a discharging signal Vdsch, and a drain coupled to a drain of FET M62 and the source of the overvoltage protection FET M61. The FET M62 includes a source coupled to the lower voltage rail, and a gate configured to receive the discharging signal Vdsch.

The gate voltage boost circuit 630 includes a capacitor C0 coupled between the gate of the FET M63 and the gate of the overvoltage protection FET M61. Additionally, the gate voltage boost circuit 630 includes a resistor R0 coupled between the upper voltage rail Vdd and the gate of the overvoltage protection FET M61. Further, the gate voltage boost circuit 630 includes a FET M64 (e.g., a PMOS FET) coupled between the upper voltage rail Vdd and the gate of the overvoltage protection FET M61. That is, the FET M64 includes a source coupled to the upper voltage rail Vdd, a gate coupled to the output of the boost voltage generator 610, and a drain coupled to the gate of the overvoltage protection FET M61.

Figure 6B:
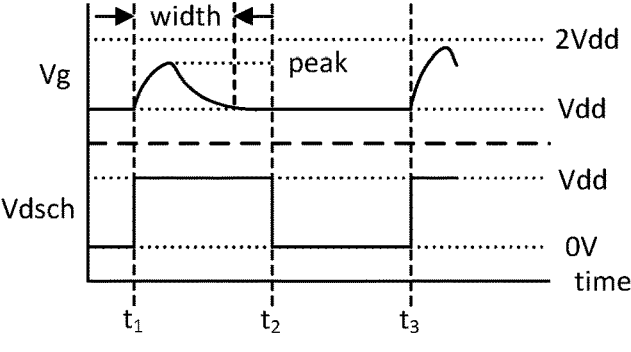
FIG. 6B illustrates a graph depicting an example timing relationship between a gate voltage for an overvoltage protection field effect transistor (FET) and a discharging signal in accordance with another aspect of the disclosure.

FIG. 6B illustrates a graph depicting an example timing relationship between the gate voltage Vg for the overvoltage protection FET M61 and the discharging signal Vdsch in accordance with another aspect of the disclosure. The x- or horizontal axis represents time. The upper and lower sections of the y- or vertical axis represent the gate voltage Vg and the discharging signal Vdsch. The discharging signal Vdsch may toggle between a non-asserted state (e.g., at 0V) and an asserted state (e.g., at Vdd). The gate voltage Vg may vary between a non-boosted level (e.g., at Vdd) and a boosted level (e.g., >Vdd). The operation of the gate voltage boost circuit 630 is as follows:

The time interval $t_1$ to $t_2$ is the discharging phase, and the time interval $t_2$-$t_3$ is the non-discharging phase where the boosted voltage Vbst is used for its intended purpose (e.g., to provide the boost voltage Vbst to a load $C_L$ or turn on a FET (e.g., FET M11)). As illustrated, prior to time $t_1$, the discharging signal is not asserted (e.g., at 0V), and responsively, the gate voltage boost circuit 630 generates the gate voltage Vg at its non-boosted level (e.g., Vdd). In particular, the resistor R0 of the gate voltage boost circuit 630 routes Vdd potential from the upper voltage rail Vdd to the gate of the overvoltage protection FET M61. The discharging signal Vdsch being at 0V turns off FET M62 and turns on FET M63 to apply Vdd to the source of the overvoltage protection FET M61 to turn off M61 as its gate-to-source voltage (Vgs) is substantially 0V (e.g., Vg=Vdd, Vs=Vdd→Vgs=Vdd−Vdd=0V). Thus, enabling M63 to charge the source voltage Vs of M61 to Vdd can turn off M61, and also avoid overvoltage stress in this phase (e.g., before $t_1$/discharging).

At the beginning of the discharging phase at time $t_1$, the discharging signal Vdsch becomes asserted (e.g., by transitioning from 0V to Vdd). The discharging signal Vdsch being at Vdd turns off FET M63 and turns on FET M62 to effectuate the discharging of the boost voltage Vbst. In response, the gate voltage boost circuit 630 boosts the gate voltage Vg above its non-boosted voltage level. In particular, the capacitor C0 of the gate voltage boost circuit 630 couples the rising edge of the discharging signal Vdsch to the gate of the overvoltage protection FET M61 to form a pulse in the gate voltage Vg to achieve the boosting thereof. The peak and width of the gate voltage Vg pulse is controlled by FET M64 based on the boost voltage Vbst, which operates as a voltage-controlled resistor.

For example, if the boost voltage Vbst is relatively large (e.g., ~2Vdd), the boost voltage Vbst, being applied to the gate of the FET M64, causes the FET M64 to exhibit a relatively high resistance. As such, the gate of the overvoltage protection FET M61 is well isolated from the upper voltage rail Vdd allowing the gate voltage Vg to achieve a relatively high peak (e.g., ~2Vdd). Furthermore, the high resistance of the FET M64 makes the time constant of the gate voltage Vg pulse relatively large to achieve a relatively large width. The relatively large pulse width ensures that the overvoltage protection FET M61 is not subjected to overvoltage stress during the discharging phase.

On the other hand, if the boost voltage Vbst is relatively small (e.g., 0.5Vdd), the boost voltage Vbst, being applied to the gate of the FET M64, causes the FET M64 to exhibit a relatively low resistance. As such, the gate of the overvoltage protection FET M61 is more influenced by the upper voltage rail Vdd, inhibiting the gate voltage Vg to achieve a relatively high peak (e.g., ~1.5Vdd). Furthermore, the low resistance of the FET M64 makes the time constant of the gate voltage Vg pulse relatively small to achieve a relatively small width to expedite the discharging of the boost voltage Vbst. By the end of the discharging phase at time $t_2$, the gate voltage Vg has returned to its non-boosted level (e.g., at Vdd), and remains at such level during the non-discharging phase when the discharging signal Vdsch becomes and remains deasserted during time interval $t_2$ to $t_3$.

Figure 7:
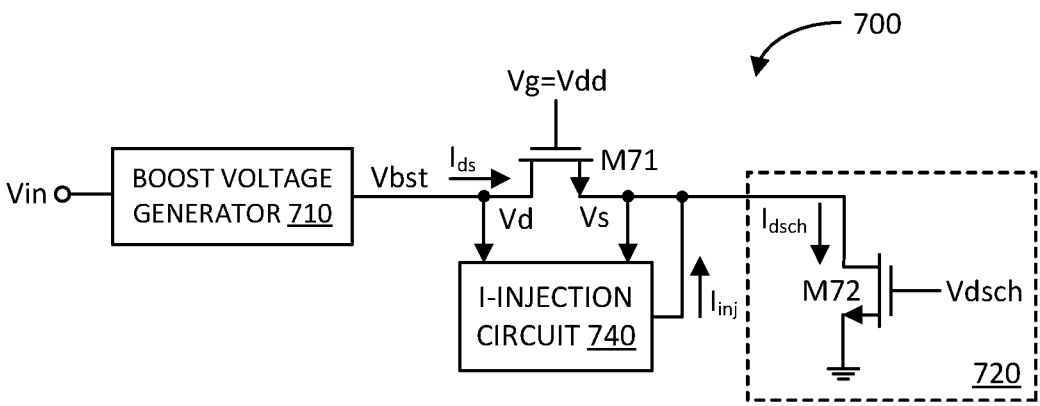
FIG. 7 illustrates a schematic/block diagram of another example voltage booster in accordance with another aspect of the disclosure.

FIG. 7 illustrates a schematic/block diagram of another example voltage booster 700 in accordance with another aspect of the disclosure. As discussed in more detail herein, the voltage booster 700 includes a current injection circuit configured to supply current to the discharging circuit to offload or reduce the drain-to-source current $I_{ds}$ of the overvoltage protection field effect transistor (FET). The current injection circuit supplies the current based on the drain-to-source voltage (Vds) of the overvoltage protection FET. Accordingly, if Vds is relatively high (e.g., approaching an overvoltage stress condition), the current injection circuit supplies relatively high current to the discharging circuit to offload more drain-to-source current Ias from the overvoltage protection FET, to reduce its drain-to-source voltage (Vds), and maintain the overvoltage protection FET from being subjected to overvoltage stress.

In particular, the voltage booster 700 includes a boost voltage generator 710, an overvoltage protection FET M71, a discharging circuit 720, and a current injection circuit 740. The boost voltage generator 710 is configured to generate a boost voltage Vbst based on an input voltage Vin, wherein the boost voltage Vbst may be as high as 2Vdd. The overvoltage protection FET M71 (e.g., an NMOS FET) includes a drain coupled to an output of the boost voltage generator 710 (at which the boost voltage Vbst is produced), a source coupled to the discharging circuit 720, and a gate configured to receive a gate voltage Vg (e.g., at ~Vdd).

The discharging circuit 720 includes a FET M72 (e.g., an NMOS FET) including a drain coupled to the source of the overvoltage protection FET M71, a source coupled to a lower voltage rail (e.g., ground), and a gate configured to receive a discharging signal Vdsch. The current injection circuit 740 includes inputs configured to receive the drain voltage Vd and the source voltage Vs of the overvoltage protection FET M71, and an output to supply an injection current $I_{inj}$ to the discharging circuit 720 based on the drain-to-source voltage Vds of the overvoltage protection FET M71. As discussed in a more detailed implementation further herein, one of the inputs also serves as the output of the current injection circuit 740.

During a first operating phase, the discharging signal Vdsch is asserted to turn on the FET M72 to discharge the output of the boost voltage generator 710 to ground via the overvoltage protection FET M71 to reduce the boost voltage Vbst to, for example, 0V. The FET M72, being turned on, causes the source voltage Vs of the overvoltage protection FET M71 to decrease towards ground. If the boost voltage Vbst is relatively high (e.g., ~2Vdd), the drain-to-source voltage Vds of the overvoltage protection FET M71 increases towards 2Vdd as its source voltage Vs decreases due to the discharging circuit 720. The current injection circuit 740 senses the increase in the drain-to-source voltage Vds of the overvoltage protection FET M71, and supplies the injection current $I_{inj}$ based on Vds to the discharging circuit 720.

If the discharging current $I_{dsch}$ through the discharging circuit 720 is substantially constant, the drain-to-source current $I_{ds}$ of the overvoltage protection FET M71 is offloaded or reduced by the injection current $I_{inj}$ (e.g., $I_{ds}+I_{inj}=I_{dsch}\rightarrow I_{ds}=I_{dsch}-I_{inj}$). This reduction in the $I_{ds}$ reduces the drain-to-source voltage Vds of the overvoltage protection FET M71. Or characterized differently, the injection current $I_{inj}$ increases the source voltage Vs to reduce drain-to-source voltage Vds of the overvoltage protection FET M71, and prevent overvoltage stress on the FET M71. If the boost voltage Vbst is relatively small, which translates to a relatively small drain-to-source voltage Vds for the overvoltage protection FET M71, the current injection circuit 740 generates a relatively small injection current $I_{inj}$ based on Vds as less injection current $I_{inj}$ is needed to maintain the overvoltage protection FET M71 from overvoltage stress conditions.

During a second operating phase, the discharging signal Vdsch is deasserted to turn off the FET M72 so that the boost voltage Vbst generated by the boost voltage generator 710 may be used in accordance with its intended purpose (e.g., to provide the boost voltage Vbst to a load $C_L$ or turn on a FET (e.g., FET M11)). Accordingly, the $I_{ds}$ of the overvoltage protection FET M71 and the injection current $I_{inj}$ are substantially zero (0) ampere (A) as the discharging path is cut off. The source voltage Vs of M71 is charged to Vbst-Vth or Vdd, whichever is smaller, which maintains FET M71 from being subjected to overvoltage stress.

Figure 8:
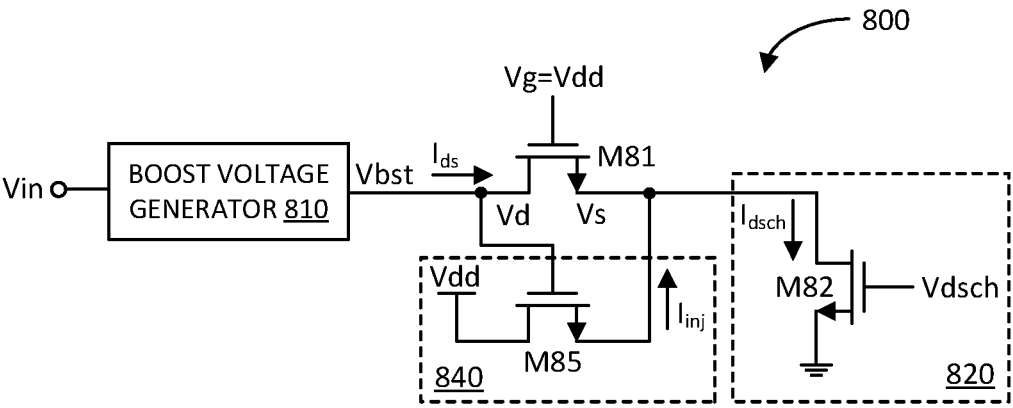
FIG. 8 illustrates a schematic/block diagram of another example voltage booster in accordance with another aspect of the disclosure.

FIG. 8 illustrates a schematic/block diagram of another example voltage booster 800 in accordance with another aspect of the disclosure. The voltage booster 800 may be an example more detailed implementation of the voltage booster 700. In particular, the voltage booster 800 includes a boost voltage generator 810, an overvoltage protection field effect transistor (FET) M81, a discharging circuit 820, and a current injection circuit 840.

The boost voltage generator 810 is configured to generate a boost voltage Vbst based on an input voltage Vin, wherein the boost voltage Vbst may be as high as 2Vdd. The overvoltage protection FET M81 (e.g., an NMOS FET) includes a drain coupled to an output of the boost voltage generator 810 (at which the boost voltage Vbst is produced), a source coupled to the discharging circuit 820, and a gate configured to receive a gate voltage Vg (e.g., at ~Vdd). The discharging circuit 820 includes a FET M82 (e.g., an NMOS FET) including a drain coupled to the source of the overvoltage protection FET M81, a source coupled to a lower voltage rail (e.g., ground), and a gate configured to receive a discharging signal Vdsch.

The current injection circuit 840 includes a FET M85 (e.g., an NMOS FET) including a drain coupled to an upper voltage rail Vdd, a gate coupled to a drain of the overvoltage protection FET M81, and a source coupled to the source of the overvoltage protection FET M81. The FET M85 is configured to generate an injection current $I_{inj}$ (e.g., its drain-to-source current) based on the drain-to-source voltage Vds of the overvoltage protection FET M81.

During a first operating phase, the discharging signal Vdsch is asserted to turn on the FET M82 to discharge the output of the boost voltage generator 810 to ground via the overvoltage protection FET M81 to reduce the boost voltage Vbst to, for example, 0V. The FET M82, being turned on, causes the source voltage Vs of the overvoltage protection FET M81 to decrease towards ground. If the boost voltage Vbst is relatively high (e.g., ~2Vdd), the drain-to-source voltage Vds of the overvoltage protection FET M81 increases towards 2Vdd as its source voltage Vs decreases due to the discharging circuit 820. The gate-to-source voltage Vgs of the FET M85, being substantially the same as the drain-to-source voltage Vds of the overvoltage protection FET M81, senses the increase in the Vds of the overvoltage protection FET M81, and supplies the injection current $I_{inj}$ based on Vds to the discharging circuit 820.

In the initial discharging phase (the time overvoltage stress happens), the discharging current $I_{dsch}$ can be considered relatively constant. If the discharging current $I_{dsch}$ through the discharging circuit 820 is substantially constant, the drain-to-source current Ias of the overvoltage protection FET M81 is offloaded or reduced by the injection current $I_{inj}$ (e.g., $I_{ds}+I_{inj}=I_{dsch}\rightarrow I_{ds}=I_{dsch}-I_{inj}$). This reduction in the $I_{ds}$ reduces the Vds of the overvoltage protection FET M81. Or characterized differently, the injection current $I_{inj}$ increases the source voltage Vs to reduce the drain-to-source voltage Vds of the overvoltage protection FET M81 to prevent overvoltage stress on the FET M81. If the boost voltage Vbst is relatively small, which translates to a relatively small drain-to-source voltage Vds for the overvoltage protection FET M81, the FET M85 generates a relatively small injection current $I_{inj}$ based on Vds as less injection current $I_{inj}$ is needed to maintain the overvoltage protection FET M81 from overvoltage stress conditions.

During a second operating phase, the discharging signal Vdsch is deasserted to turn off the FET M82 so that the boost voltage Vbst generated by the boost voltage generator 810 may be used in accordance with its intended purpose (e.g., to provide the boost voltage Vbst to a load $C_L$ or turn on a FET (e.g., FET M11)). Accordingly, the $I_{ds}$ of the overvoltage protection FET M81 and the injection current $I_{inj}$ are substantially 0A as the discharging path is cut off. The source voltage Vs of M81 is charged to Vbst-Vth or Vdd, whichever is smaller, which maintains FET M81 from being subjected to overvoltage stress.

Figure 9:
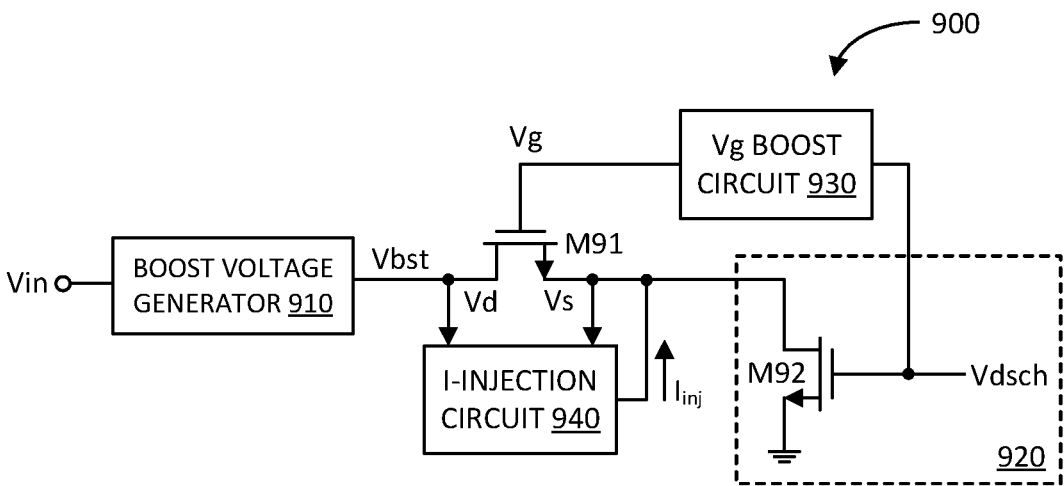
FIG. 9 illustrates a schematic/block diagram of another example voltage booster in accordance with another aspect of the disclosure.

FIG. 9 illustrates a schematic/block diagram of another example voltage booster 900 in accordance with another aspect of the disclosure. The voltage booster 900 combines the gate voltage boost circuit 530 of voltage booster 500 and the current injection circuit 740 of voltage booster 700 to prevent overvoltage stress on an overvoltage protection field effect transistor (FET).

In particular, the voltage booster 900 includes a boost voltage generator 910, an overvoltage protection FET M91, a discharging circuit 920, and a gate voltage boost circuit 930. The boost voltage generator 910 is configured to generate a boost voltage Vbst based on an input voltage Vin, wherein the boost voltage Vbst may be as high as 2Vdd. The overvoltage protection FET M91 (e.g., an NMOS FET) includes a drain coupled to an output of the boost voltage generator 910 (at which the boost voltage Vbst is produced), a source coupled to the discharging circuit 920, and a gate configured to receive a gate voltage Vg. The discharging circuit 920 includes a FET M92 (e.g., an NMOS FET) including a drain coupled to the source of the overvoltage protection FET M91, a source coupled to a lower voltage rail (e.g., ground), and a gate configured to receive a discharging signal Vdsch.

The gate voltage boost circuit 930 includes an input configured to receive the discharging signal Vdsch, and is configured to generate a boosted gate voltage Vg for the overvoltage protection FET M91 in response to the discharging signal Vdsch becoming asserted. When the discharging signal Vdsch is not asserted, the gate voltage boost circuit 930 may be configured to generate the gate voltage Vg at a non-boosted voltage level (e.g., Vdd). The detail operation of the gate voltage boost circuit 930 has been discussed with reference to gate voltage boost circuit 530 of voltage booster 500.

The current injection circuit 940 includes inputs configured to receive the drain voltage Vd and the source voltage Vs of the overvoltage protection FET M91, and an output to supply an injection current I$_{inj}$ to the discharging circuit 920 based on the drain-to-source voltage Vds of the overvoltage protection FET M91. The detail operation of the current injection circuit 940 has been discussed with reference to current injection circuit 740 of voltage booster 700.

Figure 10:
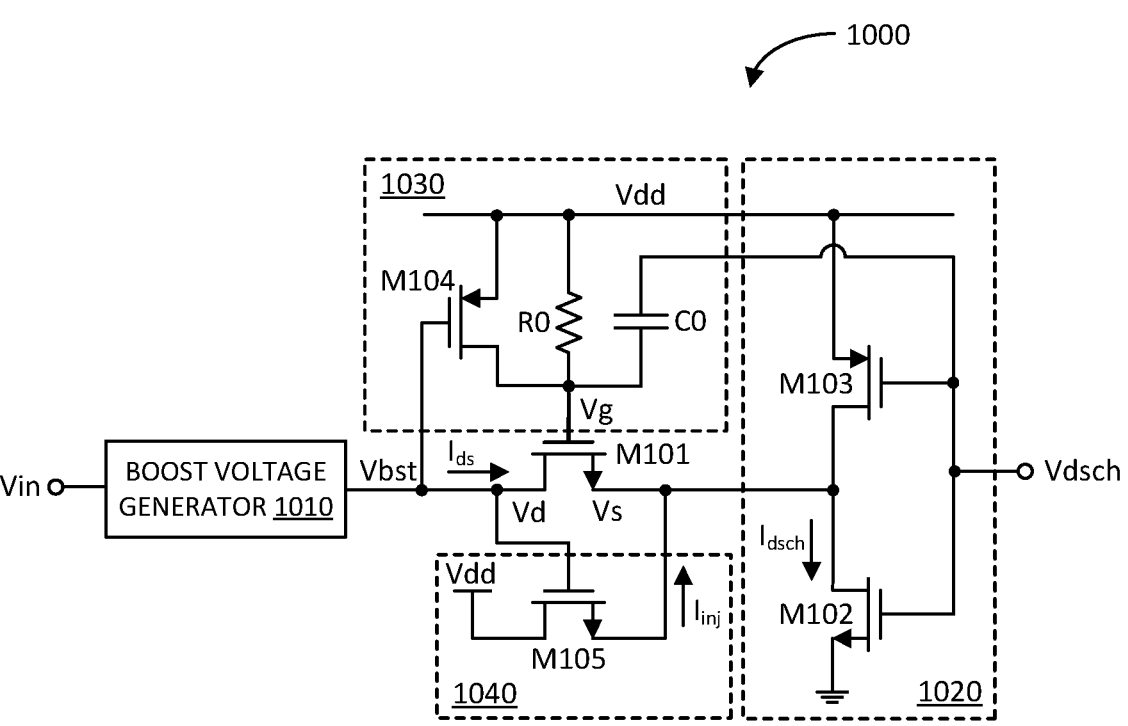
FIG. 10 illustrates a schematic/block diagram of another example voltage booster in accordance with another aspect of the disclosure.

FIG. 10 illustrates a schematic/block diagram of another example voltage booster 1000 in accordance with another aspect of the disclosure. The voltage booster 1000 may be an example more detailed implementation of the voltage booster 900. In particular, the voltage booster 1000 includes a boost voltage generator 1010, an overvoltage protection field effect transistor (FET) M101, a discharging circuit 1020, a gate voltage boost circuit 1030, and current injection circuit 1040.

The boost voltage generator 1010 is configured to generate a boost voltage Vbst based on an input voltage Vin, wherein the boost voltage Vbst may be as high as 2Vdd. The overvoltage protection FET M101 (e.g., an NMOS FET) includes a drain coupled to an output of the boost voltage generator 1010 (at which the boost voltage Vbst is produced), a source coupled to the discharging circuit 1020, and a gate configured to receive a gate voltage Vg. The discharging circuit 1020 includes a FET M103 (e.g., a PMOS FET) coupled in series with a FET M102 (e.g., an NMOS FET) between an upper voltage rail Vdd and a lower voltage rail (e.g., ground). That is, the FET M103 includes a source coupled to the upper voltage rail Vdd, a gate configured to receive a discharging signal Vdsch, and a drain coupled to a drain of FET M102 and the source of the overvoltage protection FET M101. The FET M102 includes a source coupled to the lower voltage rail, and a gate configured to receive the discharging signal Vdsch.

The gate voltage boost circuit 1030 includes a capacitor C0 coupled between the gate of the FET M103 and the gate of the overvoltage protection FET M101. Additionally, the gate voltage boost circuit 1030 includes a resistor R0 coupled between the upper voltage rail Vdd and the gate of the overvoltage protection FET M101. Further, the gate voltage boost circuit 1030 includes a FET M104 (e.g., a PMOS FET) coupled between the upper voltage rail Vdd and the gate of the overvoltage protection FET M101. That is, the FET M104 includes a source coupled to the upper voltage rail Vdd, a gate coupled to the output of the boost voltage generator 1010, and a drain coupled to the gate of the overvoltage protection FET M101. The detail operation of the gate voltage boost circuit 1030 has been previously discussed with reference to gate voltage boost circuit 630 of voltage booster 600.

The current injection circuit 1040 includes a FET M105 (e.g., an NMOS FET) including a drain coupled to an upper voltage rail Vdd, a gate coupled to a drain of the overvoltage protection FET M101, and a source coupled to the source of the overvoltage protection FET M101. The FET M105 is configured to generate an injection current I$_{inj}$ (e.g., its drain-to-source current) based on the drain-to-source voltage Vds of the overvoltage protection FET M101. The detail operation of the current injection circuit 1040 has been previously discussed with reference to the current injection circuit 840 of voltage booster 800.

Figure 11:
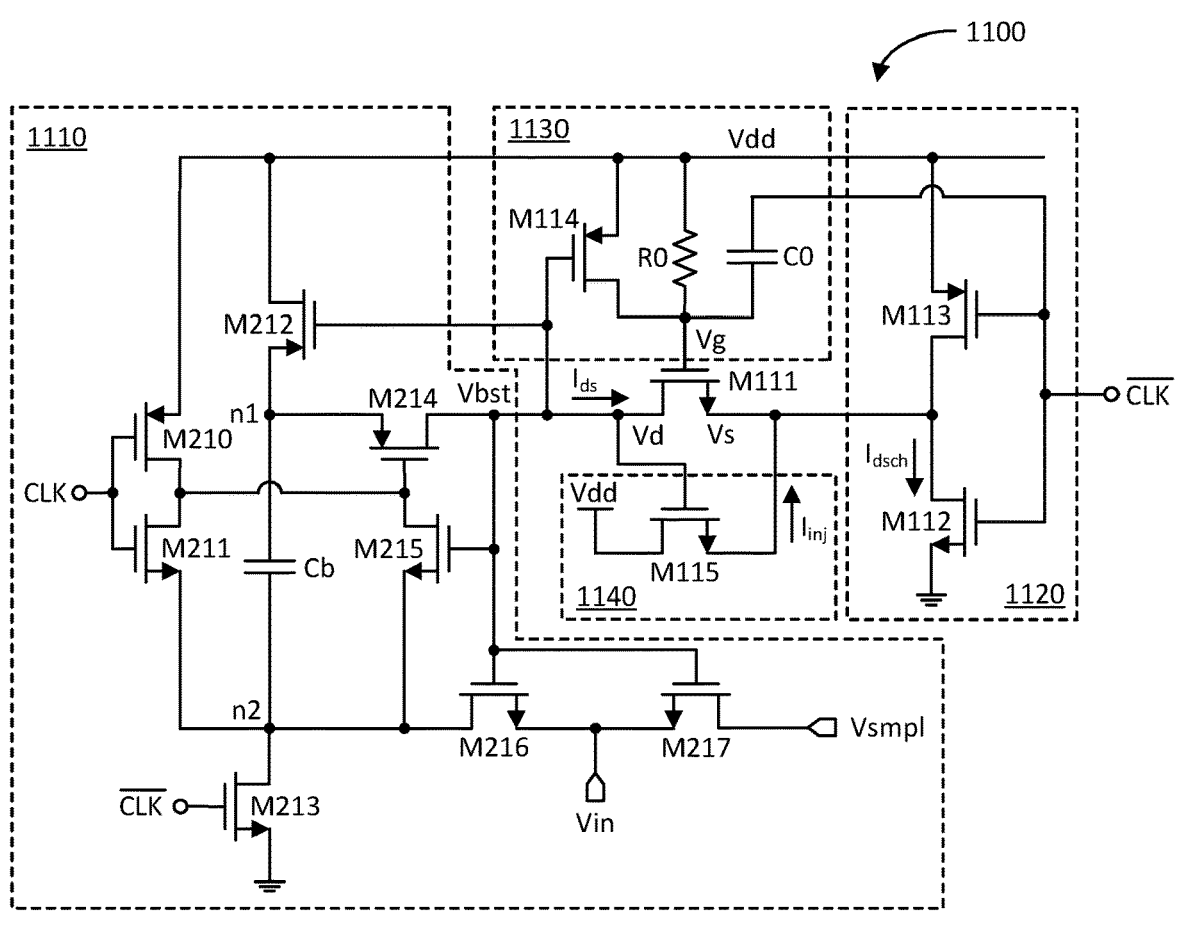
FIG. 11 illustrates a schematic/block diagram of another example voltage booster in accordance with another aspect of the disclosure.

FIG. 11 illustrates a schematic/block diagram of another example voltage booster 1100 in accordance with another aspect of the disclosure. The voltage booster 1100 may be similar to voltage booster 1000 with an example detailed implementation of a boost voltage generator. In particular, the voltage booster 1100 includes a boost voltage generator 1110, an overvoltage protection field effect transistor (FET) M111, a discharging circuit 1120, a gate voltage boost circuit 1130, and current injection circuit 1140.

The boost voltage generator 1110 is configured to generate a boost voltage Vbst based on an input voltage Vin. The overvoltage protection FET M111 (e.g., an NMOS FET) includes a drain coupled to a boost voltage output of the boost voltage generator 1110 (at which the boost voltage Vbst is produced), a source coupled to the discharging circuit 1120, and a gate configured to receive a gate voltage Vg. The discharging circuit 1120 includes a FET M113 (e.g., a PMOS FET) coupled in series with a FET M112 (e.g., an NMOS FET) between an upper voltage rail Vdd and a lower voltage rail (e.g., ground). That is, the FET M113 includes a source coupled to the upper voltage rail Vdd, a gate configured to receive a complementary clock signal CLK, and a drain coupled to a drain of FET M112 and the source of the overvoltage protection FET M111. The FET M112 includes a source coupled to the lower voltage rail, and a gate configured to receive the complementary clock signal CLK, which functions as the discharging signal Vdsch, as previously discussed.

The gate voltage boost circuit 1130 includes a capacitor C0 coupled between the gate of the FET M113 and the gate of the overvoltage protection FET M111. Additionally, the gate voltage boost circuit 1130 includes a resistor R0 coupled between the upper voltage rail Vdd and the gate of the overvoltage protection FET M111. Further, the gate voltage boost circuit 1130 includes a FET M114 (e.g., a PMOS FET) coupled between the upper voltage rail Vdd and the gate of the overvoltage protection FET M111. That is, the FET M114 includes a source coupled to the upper voltage rail Vdd, a gate coupled to the boost voltage output of the boost voltage generator 1110, and a drain coupled to the gate of the overvoltage protection FET M111. The detail operation of the gate voltage boost circuit 1130 has been previously discussed with reference to gate voltage boost circuit 630 of voltage booster 600.

The current injection circuit 1140 includes a FET M115 (e.g., an NMOS FET) including a drain coupled to the upper voltage rail Vdd, a gate coupled to a drain of the overvoltage protection FET M111, and a source coupled to the source of the overvoltage protection FET M111. The FET M115 is configured to generate an injection current $I_{inj}$ (e.g., the drain-to-source current of the FET M115) based on the drain-to-source voltage Vds of the overvoltage protection FET M111. The detail operation of the current injection circuit 1140 has been previously discussed with reference to the current injection circuit 840 of voltage booster 800.

The boost voltage generator 1110 includes a first FET M210 (e.g., a PMOS FET) and a second FET M211 (e.g., an NMOS FET) coupled in series between the upper voltage rail Vdd, and a node n2. That is, the first FET M210 includes a source coupled to the upper voltage rail Vdd, a gate configured to receive a non-complementary clock signal CLK, and a drain coupled to a drain of the second FET M211. The second FET M211 includes a gate coupled to the gate of the first FET M210, and also configured to receive the non-complementary clock signal CLK. The second FET M211 includes a source coupled to node n2.

The boost voltage generator 1110 further includes a third FET M212 (e.g., a PMOS FET), a boost capacitor Cb, and a fourth FET M213 (e.g., an NMOS FET) coupled in series between the upper voltage rail Vdd and the lower voltage rail. That is, the third FET M212 includes a drain/source coupled to the upper voltage rail Vdd, a gate coupled to the boost voltage output of the boost voltage generator 1110, and a source/drain coupled to a node n1. The boost capacitor Cb is coupled between the nodes n1 and n2. And, the third FET M213 includes a drain coupled to node n2, a gate configured to receive the complementary clock signal $\overline{CLK}$, and a source coupled to the lower voltage rail.

With regard to the terms "drain/source" and "source/drain", the FET M212 may be a symmetrical device with a gate and two terminals. The terminal of the PMOS FET M212 with a higher voltage is typically referred to as the source, and the one with the lower voltage is referred to as a drain. However, with regard to PMOS FET M212, in one configuration, the voltage Vdd is higher than the voltage at node n1. Thus, in such configuration, the source of PMOS FET M212 is coupled to Vdd and the drain of PMOS FET M212 is coupled to node n1. In another configuration, the voltage at node n1 is higher than Vdd. Thus, in such configuration, the source of PMOS FET M212 is coupled to node n1 and the drain of PMOS FET M212 is coupled to Vdd. The same explanation applies to the "drain/source" and "source/drain" applies to FET M222 described further herein.

Additionally, the boost voltage generator 1110 includes a fifth FET M214 (e.g., a PMOS FET) coupled between node n1 and the boost voltage output of the boost voltage generator 1110. That is, the fifth FET M214 includes a source coupled to node n1, a gate coupled to the drains of the first and second FETs M210 and M211, and a drain coupled to the output of the boost voltage generator 1110. The boost voltage generator 1110 also includes a sixth FET M215 (e.g., an NMOS FET) including a drain coupled to the gate of the fifth FET M214, a gate coupled to the output of the boost voltage generator 1110, and a source coupled to node n2.

Further, the boost voltage generator 1110 includes a seventh FET M216 (e.g., an NMOS FET) and an eighth FET (e.g., an NMOS FET) coupled in series between node n2 and a sampled voltage (Vsmpl) output. That is, the seventh FET M216 includes a drain coupled to node n2, a gate coupled to the boost voltage output of the boost voltage generator 1110, and a source coupled to a source of the eighth FET M217, where the sources of the FETs M216 and M217 serve as an input for the input voltage Vin. The eighth FET M217 includes a gate coupled to the boost voltage output of the boost voltage generator 1110, and a drain serving as the sampled voltage (Vsmpl) output.

In operation, when the non-complementary and complementary clock signal CLK and $\overline{CLK}$ are low (e.g., 0V) and high (e.g., Vdd), respectively, the discharging circuit 1120 is discharging the output of the boost voltage generator 1110, while the gate voltage boost circuit 1130 and current injection circuit 1140 are protecting the overvoltage protection FET M111 as previously discussed. With regard to the boost voltage generator 1110, the discharging circuit 1120 reducing the boost voltage Vbst causes the FET M212 to turn on to apply Vdd to a first terminal (at node n1) of the boost capacitor Cb. The high complementary clock signal $\overline{CLK}$ turns on FET M213 to apply ground potential to the second terminal (at node n2) of the boost capacitor Cb. And, the low non-complementary clock signal CLK turns on FET M210 to apply Vdd to the gate of FET M214 to turn it off so as to isolate the boost capacitor Cb from the output of the boost voltage generator 1110. Thus, during this phase, the boost capacitor Cb gets charged to Vdd potential, and the output of the boost voltage generator 1110 is discharged to ground. The grounding of the boost voltage output of the boost voltage generator 1110 also turns off FETs M215, M216, and M217.

When the non-complementary and complementary clock signal CLK and $\overline{CLK}$ are high and low, respectively, the high non-complementary clock signal CLK turns on FET M211, and couples the gate of M214 to the second terminal (at node n2) of the boost capacitor Cb. This has the effect of turning on FET M214. The Vdd at the first terminal (at node n1) of the boost capacitor Cb is routed to the gates of FETs M215, M216, and M217 to turn these FETs on. The low complementary clock signal $\overline{CLK}$ turns off FET M213 to isolate the second terminal (at node n2) of the boost capacitor Cb from ground. The low complementary clock signal $\overline{CLK}$ also disables the discharging circuit 1120, the gate voltage boost circuit 1130, and the current injection circuit 1140. As FET M216 is turned on, it routes the input voltage Vin to the second terminal (at node n2) of the boost capacitor Cb causing the boost voltage Vbst to be the sum of Vdd and the input voltage Vin (e.g., per a bootstrapped switch operation). The turning on of FET M217 causes the input voltage Vin to be sampled and produced at the sampled voltage (Vsmpl) output.

Figure 12:
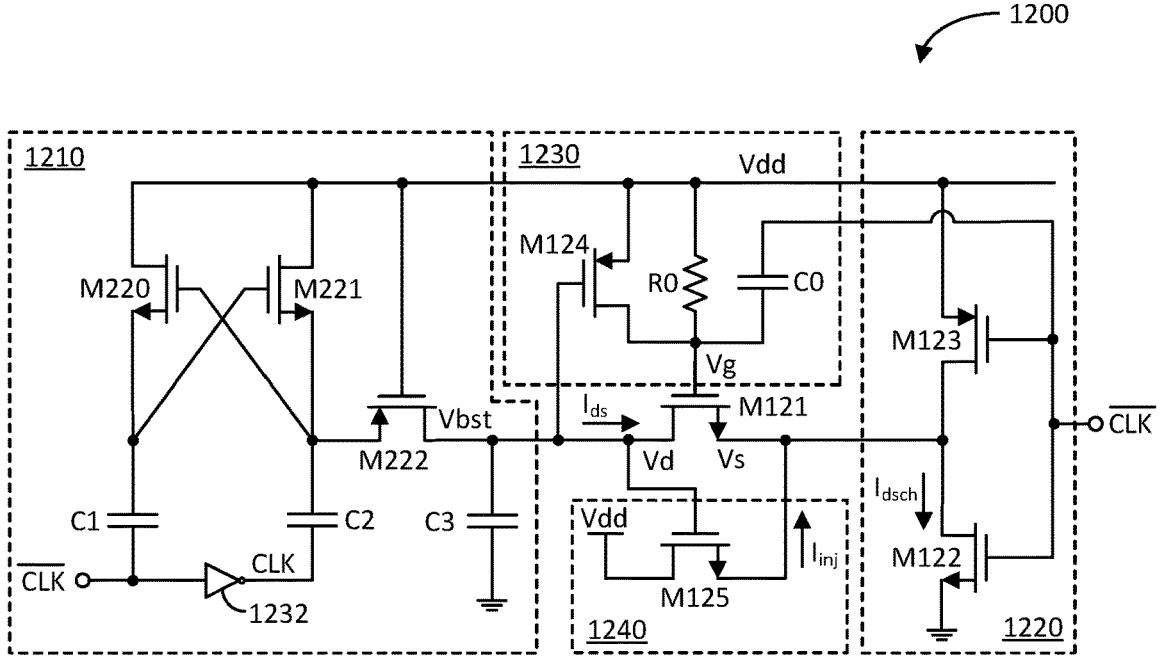
FIG. 12 illustrates a schematic/block diagram of another example voltage booster in accordance with another aspect of the disclosure.

FIG. 12 illustrates a schematic/block diagram of another example voltage booster 1200 in accordance with another aspect of the disclosure. The voltage booster 1200 may be similar to voltage booster 1000 with another example detailed implementation of a boost voltage generator. In particular, the voltage booster 1200 includes a boost voltage generator 1210, an overvoltage protection field effect transistor (FET) M121, a discharging circuit 1220, a gate voltage boost circuit 1230, and current injection circuit 1240.

The boost voltage generator 1210 is configured to generate a boost voltage Vbst based on an input voltage Vin (e.g., per a charge pump operation where Vin is Vdd). The overvoltage protection FET M121 (e.g., an NMOS FET) includes a drain coupled to an output of the boost voltage generator 1210 (at which the boost voltage Vbst is produced), a source coupled to the discharging circuit 1220, and a gate configured to receive a gate voltage Vg. The discharging circuit 1220 includes a FET M123 (e.g., a PMOS FET) coupled in series with a FET M122 (e.g., an NMOS FET) between an upper voltage rail Vdd and a lower voltage rail (e.g., ground). That is, the FET M123 includes a source coupled to the upper voltage rail Vdd, a gate configured to receive a complementary clock signal $\overline{CLK}$, and a drain coupled to a drain of FET M122 and the source of the overvoltage protection FET M121. The FET M122 includes a source coupled to the lower voltage rail, and a gate configured to receive the complementary clock signal $\overline{CLK}$, which functions as the discharging signal Vdsch, as previously discussed.

The gate voltage boost circuit 1230 includes a capacitor C0 coupled between the gate of the FET M123 and the gate of the overvoltage protection FET M121. Additionally, the gate voltage boost circuit 1230 includes a resistor R0 coupled between the upper voltage rail Vdd and the gate of the overvoltage protection FET M121. Further, the gate voltage boost circuit 1230 includes a FET M124 (e.g., a PMOS FET) coupled between the upper voltage rail Vdd and the gate of the overvoltage protection FET M121. That is, the FET M124 includes a source coupled to the upper voltage rail Vdd, a gate coupled to the output of the boost voltage generator 1210, and a drain coupled to the gate of the overvoltage protection FET M121. The detail operation of the gate voltage boost circuit 1230 has been previously discussed with reference to gate voltage boost circuit 630 of voltage booster 600.

The current injection circuit 1240 includes a FET M125 (e.g., an NMOS FET) including a drain coupled to the upper voltage rail Vdd, a gate coupled to a drain of the overvoltage protection FET M121, and a source coupled to the source of the overvoltage protection FET M121. The FET M125 is configured to generate an injection current $I_{inj}$ (e.g., its drain-to-source current) based on the drain-to-source voltage Vds of the overvoltage protection FET M121. The detail operation of the current injection circuit 1240 has been previously discussed with reference to the current injection circuit 840 of voltage booster 800.

The boost voltage generator 1210 includes a first FET M220 (e.g., an NMOS FET) and a first capacitor C1 coupled in series between the upper voltage rail Vdd and an input for the complementary clock signal $\overline{CLK}$. The boost voltage generator 1210 further includes a second FET M221 (e.g., an NMOS FET) and a second capacitor C2 coupled in series between the upper voltage rail Vdd and an output of an inverter 1232. The inverter 1232 includes an input configured to receive the complementary clock signal $\overline{CLK}$; and thereby, outputs a non-complementary clock signal CLK.

More specifically, the first FET M220 includes a source coupled to the upper voltage rail Vdd, a gate coupled to a first terminal of the second capacitor C2, and a drain coupled to a first terminal of the first capacitor C1. Similarly, the second FET M221 includes a source coupled to the upper voltage rail Vdd, a gate coupled to the first terminal of the first capacitor C1, and a drain coupled to the first terminal of the second capacitor C2. As mentioned, the first capacitor C1 includes a second terminal coupled to the input of the complementary clock signal $\overline{CLK}$, and the second capacitor C2 includes a second terminal coupled to the output of the inverter 1232.

The boost voltage generator 1210 further includes a third FET M222 (e.g., a PMOS FET) including a source/drain coupled to the first terminal of the second capacitor C2, a gate coupled to the upper voltage rail Vdd, and a drain/source coupled to a first terminal of a third capacitor C3 (at the output of the boost voltage generator 1210). The third capacitor C3 includes a second terminal coupled to the lower voltage rail.

In operation, when the non-complementary and complementary clock signal CLK and $\overline{CLK}$ are low (e.g., 0V) and high (e.g., Vdd), respectively, the discharging circuit 1220 is discharging the output of the boost voltage generator 1210, while the gate voltage boost circuit 1230 and current injection circuit 1240 are protecting the overvoltage protection FET M121 as previously discussed. The high complementary clock signal $\overline{CLK}$ is applied to the gate of FET M221 via the first capacitor C1, and turns on the FET M221 to cause Vdd to be applied to the first terminal of the second capacitor C2. Further, the low non-complementary clock signal CLK produced by the inverter 1232 applies ground potential (0V) to the second terminal of the second capacitor C2. This causes the second capacitor C2 to be charged to substantially Vdd potential. During this phase, the source-to-gate voltage Vsg of FET M222 is substantially 0V; and thereby, turned off.

When the non-complementary and complementary clock signal CLK and $\overline{CLK}$ are high and low, respectively, the low complementary clock signal $\overline{CLK}$ turns off FET M221, and the high non-complementary clock signal CLK generated by the inverter 1232 is applied to the second terminal of the second capacitor C2. This causes the voltage at the first terminal of the second capacitor C2 to become substantially 2Vdd. As the source-to-gate voltage Vsg of the FET M222 is now substantially Vdd, the FET M222 turns on, and generates the boost voltage Vbst across the third capacitor C3 (at the output of the boost voltage generator 1210). Further, the low complementary clock signal $\overline{CLK}$ also disables the discharging circuit 1220, the gate voltage boost circuit 1230, and the current injection circuit 1240.

FIG. 13 illustrates a flow diagram of an example method 1300 of reducing a boost voltage at an output of a boost voltage generator in accordance with another aspect of the disclosure. The method 1300 includes discharging the output of the boost voltage generator via a first field effect transistor (FET) in response to a discharge signal becoming asserted (block 1310). Examples of means for discharging the output of the boost voltage generator via a first field effect transistor (FET) in response to a discharge signal becoming asserted include any of the discharging circuits described herein.

The method 1300 further includes boosting a gate voltage applied to a gate of the first FET in response to the asserted discharging signal (block 1320). Examples of means for boosting a gate voltage applied to a gate of the first FET in response to the asserted discharging signal include any of the gate voltage boost circuits described herein.

FIG. 14 illustrates a flow diagram of another example method 1400 of reducing a boost voltage at an output of a boost voltage generator in accordance with another aspect of the disclosure. The method 1400 includes discharging the output of the boost voltage generator via a first field effect transistor (FET) and a second FET in response to an asserted discharging signal applied to a gate of the second FET (block 1410). Examples of means for discharging the output of the boost voltage generator via a first field effect transistor (FET) and a second FET in response to an asserted discharge signal include any of the discharging circuits described herein.

The method 1400 further includes generating an injection current (block 1420). Examples of means for generating an injection current include any of the current injection circuits described herein. Additionally, the method 1400 includes combining the injection current with a drain-to-source current of the first FET to form a discharging current through the second FET (block 1430). Examples of means for combining the injection current with a drain-to-source current of the first FET to form a discharging current through the second FET include the any of the coupling of the current injection circuits to the corresponding overvoltage protection FETs described herein.

Figure 15:
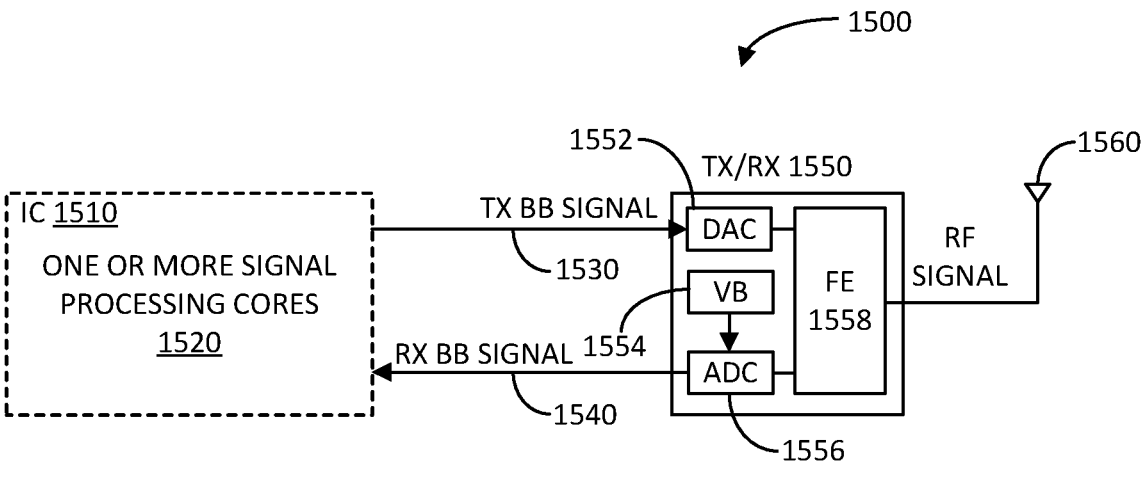
FIG. 15 illustrates a block diagram of an example wireless communication device in accordance with another aspect of the disclosure.

FIG. 15 illustrates a block diagram of an example wireless communication device 1500 in accordance with another aspect of the disclosure. The wireless communication device 1500 may be a smart phone, a desktop computer, laptop computer, tablet device, Internet of Things (IoT), wearable wireless device (e.g., wireless watch), and other types of wireless device.

In particular, the wireless communication device 1500 includes an integrated circuit (IC) 1510, which may be implemented as a system on chip (SOC). The IC 1510 includes one or more signal processing cores 1520 configured to generate a transmit (Tx) baseband (BB) signal and process a received (Rx) baseband (BB) signal.

The wireless communication device 1500 may further include a transceiver 1550 and at least one antenna 1560 (e.g., an antenna array). The transceiver 1550 is coupled to the one or more signal processing cores 1520 to receive therefrom the Tx BB signal and provide thereto the Rx BB signal. The transceiver 1550 is configured to convert the Tx BB signal into a transmit (Tx) radio frequency (RF) signal, and convert a received (Rx) RF signal into the Rx BB signal. More specifically, the transceiver 1550 includes a digital-to-analog converter (DAC) 1552 configured to convert the Tx BB signal into an analog signal; an analog-to-digital converter (ADC) 1556 configured to convert the RX BB signal into a digital signal using a boost voltage generated by a voltage booster 1554 as described herein; and a front-end 1558 configured to frequency upconvert the Tx BB signal into the Tx RF signal, and to frequency downconvert the Rx RF signal into the Rx BB signal.

The transceiver 1550 is coupled to the at least one antenna 1560 to provide thereto the Tx RF signal for electromagnetic radiation into a wireless medium for wireless transmission, and receive the Rx RF signal electromagnetically picked up from the wireless medium by the at least one antenna 1560.

The following provides an overview of aspects of the present disclosure:

Aspect 1: An apparatus, comprising: a boost voltage generator configured to generate a boost voltage at an output; a first field effect transistor (FET) including a drain/source terminal coupled to the output of the boost voltage generator; a discharging circuit coupled to a source/drain terminal of the first FET, wherein the discharging circuit is configured to discharge the output of the boost voltage generator via the first FET in response to a discharging signal becoming asserted; and a gate voltage boost circuit configured to generate a gate voltage for a gate of the first FET, wherein the gate voltage boost circuit is configured to boost the gate voltage in response to the asserted discharging signal.

Aspect 2: The apparatus of aspect 1, wherein the gate voltage boost circuit comprises a capacitor including a first terminal coupled to the gate of the first FET and a second terminal configured to receive the discharging signal.

Aspect 3: The apparatus of aspect 1 or 2, wherein the discharging circuit comprises a second FET including a drain/source terminal coupled to the source/drain terminal of the first FET, a source/drain terminal coupled to a lower voltage rail, and a gate configured to receive the discharging signal.

Aspect 4: The apparatus of aspect 3, wherein the discharging circuit further comprises a third FET including a source/drain terminal coupled to an upper voltage rail, a gate configured to receive the discharging signal, and a drain/source terminal coupled to the drain/source terminal of the second FET.

Aspect 5: The apparatus of any one of aspects 1-4, wherein the gate voltage boost circuit further comprises a resistor coupled between an upper voltage rail and the gate of the first FET.

Aspect 6: The apparatus of any one of aspects 1-5, wherein the gate voltage boost circuit further comprises a fourth FET including a source/drain terminal coupled to the upper voltage rail, a gate coupled to the output of the boost voltage generator, and a drain/source terminal coupled to the gate of the first FET.

Aspect 7: The apparatus of any one of aspects 1-6, wherein the gate voltage boost circuit is further configured to generate the gate voltage at a non-boosted level when the discharging signal is deasserted.

Aspect 8: The apparatus of any one of aspects 1-7, wherein the gate voltage boost circuit includes a resistor coupled between an upper voltage rail and the gate of the first FET, wherein the non-boosted level is substantially at a voltage at the upper voltage rail.

Aspect 9: The apparatus of any one of aspects 1-8, wherein the gate voltage boost circuit is configured to control a peak of the boosted gate voltage based on the boost voltage.

Aspect 10: The apparatus of any one of aspects 1-9, wherein the boosted gate voltage includes a pulse, and wherein the gate voltage boost circuit is configured to control a width of the pulse based on the boost voltage.

Aspect 11: The apparatus of any one of aspects 1-10, wherein the gate voltage boost circuit comprises: a capacitor including a first terminal configured to receive the discharging signal, and a second terminal coupled to the gate of the first FET; and a second FET including a source/drain terminal coupled to an upper voltage rail, a gate coupled to the output of the boost voltage generator, and a drain/source terminal coupled to the gate of the first FET.

Aspect 12: The apparatus of any one of aspects 1-11, further comprising a current injection circuit configured to inject a current into the discharging circuit based on a drain-to-source voltage of the first FET.

Aspect 13: The apparatus of any one of aspects 1-12, wherein the current injection circuit comprises a second FET including a drain/source terminal coupled to an upper voltage rail, a gate coupled to the drain/source terminal of the first FET, and a source/drain terminal coupled to the source/drain terminal of the first FET.

Aspect 14: The apparatus of any one of aspects 1-13, wherein the boost voltage generator comprises a bootstrapped switch voltage booster.

Aspect 15: The apparatus of any one of aspects 1-13, wherein the boost voltage generator comprises a charge pump voltage booster.

Aspect 16: A method of reducing a boost voltage at an output of a boost voltage generator, comprising: discharging the output of the boost voltage generator via a first field effect transistor (FET) in response to a discharge signal becoming asserted; and boosting a gate voltage applied to a gate of the first FET in response to the asserted discharging signal.

Aspect 17: The method of aspect 16, wherein boosting the gate voltage comprises routing the asserted discharging signal to the gate of the first FET by way of a capacitor.

Aspect 18: The method of aspect 16 or 17, wherein a resistor is coupled between an upper voltage rail and the gate of the first FET, and wherein the boosted gate voltage is higher than a voltage at the upper voltage rail.

Aspect 19: The method of any one of aspects 16-18, further comprising controlling a peak of the boosted gate voltage.

Aspect 20: The method of any one of aspects 16-19, wherein the boosted gate voltage comprises a pulse, and further comprising controlling a width of the pulse.

Aspect 21: The method of any one of aspects 16-20, further comprising: discharging the output of the boost voltage generator via a second FET in response to the asserted discharging signal; generating an injection current; and combining the injection current with a drain-to-source current of the first FET to form a discharging current through the second FET.

Aspect 22: The method of aspect 21, wherein generating the injection current comprises generating the injection current based on a drain-to-source voltage of the first FET.

Aspect 23: An apparatus, comprising: a boost voltage generator configured to generate a boost voltage at an output; a first field effect transistor (FET) including a drain/source terminal coupled to the output of the boost voltage generator; a discharging circuit coupled to a source/drain terminal of the first FET, wherein the discharging circuit is configured to discharge the output of the boost voltage generator via the first FET in response to a discharging signal becoming asserted; and a current injection circuit configured to generate and inject a current into the discharging circuit.

Aspect 24: The apparatus of aspect 23, wherein the current injection circuit is configured to generate the current based on a drain-to-source voltage of the first FET.

Aspect 25: The apparatus of aspect 23 or, wherein the discharging circuit is configured to generate a discharging current in response to the asserted discharging signal, and wherein the discharging current comprises a sum of a drain-to-source current of the first FET and the current generated by the current injection circuit.

Aspect 26: The apparatus of any one of aspects 23-25, wherein the current injection circuit comprises a third FET including a drain/source terminal coupled to an upper voltage rail, a gate coupled to a drain/source terminal of the first FET, and a source/drain terminal coupled to a source/drain terminal of the first FET.

Aspect 27: The apparatus of any one of aspects 23-26, further comprising a gate voltage boost circuit configured to generate a gate voltage for a gate of the first FET, wherein the gate voltage boost circuit is configured to boost the gate voltage in response to the asserted discharging signal.

Aspect 28: A method of reducing a boost voltage at an output of a boost voltage generator, comprising: discharging the output of the boost voltage generator via a first field effect transistor (FET) and a second FET in response to an asserted discharging signal applied to a gate of the second FET; generating an injection current; and combining the injection current with a drain-to-source current of the first FET to form a discharging current through the second FET.

Aspect 29: The method of aspect 28, wherein generating the injection current comprises generating the injection current based on a drain-to-source voltage of the first FET.

Aspect 30: A wireless communication device, comprising: at least one antenna; a transceiver coupled to the at least one antenna, wherein the transceiver includes: a voltage booster, including: a boost voltage generator configured to generate a boost voltage at an output, a first field effect transistor (FET) including a drain/source terminal coupled to the output of the boost voltage generator, a discharging circuit coupled to a source/drain terminal of the first FET, wherein the discharging circuit is configured to discharge the output of the boost voltage generator via the first FET in response to a discharging signal becoming asserted, and a gate voltage boost circuit configured to generate a gate voltage for a gate of the first FET, wherein the gate voltage boost circuit is configured to generate the gate voltage at a boosted level in response to the asserted discharging signal; and an analog-to-digital converter (ADC) configured to use the boost voltage; and an integrated circuit (IC) including one or more signal processing cores coupled to the transceiver.

Aspect 31: A wireless communication device, comprising: at least one antenna; a transceiver coupled to the at least one antenna, wherein the transceiver includes: a voltage booster, including: a boost voltage generator configured to generate a boost voltage at an output, a first field effect transistor (FET) including a drain/source terminal coupled to the output of the boost voltage generator, a discharging circuit coupled to a source/drain terminal of the first FET, wherein the discharging circuit is configured to discharge the output of the boost voltage generator via the first FET in response to a discharging signal becoming asserted, and a current injection circuit configured to generate and inject a current into the discharging circuit; and an analog-to-digital converter (ADC) configured to use the boost voltage; and an integrated circuit (IC) including one or more signal processing cores coupled to the transceiver.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed:

1. An apparatus, comprising:
a boost voltage generator configured to generate a boost voltage at an output;
a first field effect transistor (FET) including a drain/source terminal coupled to the output of the boost voltage generator;
a discharging circuit coupled to a source/drain terminal of the first FET, wherein the discharging circuit is configured to discharge the output of the boost voltage generator via the first FET in response to a discharging signal becoming asserted; and
a gate voltage boost circuit configured to generate a gate voltage for a gate of the first FET, wherein the gate voltage boost circuit is configured to boost the gate voltage in response to the asserted discharging signal.

2. The apparatus of claim 1, wherein the gate voltage boost circuit comprises a capacitor including a first terminal coupled to the gate of the first FET and a second terminal configured to receive the discharging signal.

3. The apparatus of claim 2, wherein the discharging circuit comprises a second FET including a drain/source terminal coupled to the source/drain terminal of the first FET, a source/drain terminal coupled to a lower voltage rail, and a gate configured to receive the discharging signal.

4. The apparatus of claim 3, wherein the discharging circuit further comprises a third FET including a source/drain terminal coupled to an upper voltage rail, a gate configured to receive the discharging signal, and a drain/source terminal coupled to the drain/source terminal of the second FET.

5. The apparatus of claim 2, wherein the gate voltage boost circuit further comprises a resistor coupled between an upper voltage rail and the gate of the first FET.

6. The apparatus of claim 5, wherein the gate voltage boost circuit further comprises a fourth FET including a source/drain terminal coupled to the upper voltage rail, a gate coupled to the output of the boost voltage generator, and a drain/source terminal coupled to the gate of the first FET.

7. The apparatus of claim 1, wherein the gate voltage boost circuit is further configured to generate the gate voltage at a non-boosted level when the discharging signal is deasserted.

8. The apparatus of claim 7, wherein the gate voltage boost circuit includes a resistor coupled between an upper voltage rail and the gate of the first FET, wherein the non-boosted level is substantially at a voltage at the upper voltage rail.

9. The apparatus of claim 1, wherein the gate voltage boost circuit is configured to control a peak of the boosted gate voltage based on the boost voltage.

10. The apparatus of claim 9, wherein the boosted gate voltage includes a pulse, and wherein the gate voltage boost circuit is configured to control a width of the pulse based on the boost voltage.

11. The apparatus of claim 9, wherein the gate voltage boost circuit comprises:

a capacitor including a first terminal configured to receive the discharging signal, and a second terminal coupled to the gate of the first FET; and a second FET including a source/drain terminal coupled to an upper voltage rail, a gate coupled to the output of the boost voltage generator, and a drain/source terminal coupled to the gate of the first FET.

12. The apparatus of claim 1, further comprising a current injection circuit configured to inject a current into the discharging circuit based on a drain-to-source voltage of the first FET.

13. The apparatus of claim 12, wherein the current injection circuit comprises a second FET including a drain/source terminal coupled to an upper voltage rail, a gate coupled to the drain/source terminal of the first FET, and a source/drain terminal coupled to the source/drain terminal of the first FET.

14. The apparatus of claim 1, wherein the boost voltage generator comprises a bootstrapped switch voltage booster.

15. The apparatus of claim 1, wherein the boost voltage generator comprises a charge pump voltage booster.

16. A method of reducing a boost voltage at an output of a boost voltage generator, comprising:

discharging the output of the boost voltage generator via a first field effect transistor (FET) in response to a discharge signal becoming asserted; and boosting a gate voltage applied to a gate of the first FET in response to the asserted discharging signal, wherein boosting the gate voltage comprises routing the asserted discharging signal to the gate of the first FET by way of a capacitor.

17. The method of claim 16, wherein a resistor is coupled between an upper voltage rail and the gate of the first FET, and wherein the boosted gate voltage is higher than a voltage at the upper voltage rail.

18. The method of claim 16, further comprising controlling a peak of the boosted gate voltage.

19. The method of claim 16, wherein the boosted gate voltage comprises a pulse, and further comprising controlling a width of the pulse.

20. The method of claim 16, further comprising:

discharging the output of the boost voltage generator via a second FET in response to the asserted discharging signal;

generating an injection current; and combining the injection current with a drain-to-source current of the first FET to form a discharging current through the second FET.

21. The method of claim 20, wherein generating the injection current comprises generating the injection current based on a drain-to-source voltage of the first FET.

22. An apparatus, comprising:

a boost voltage generator configured to generate a boost voltage at an output;

a first field effect transistor (FET) including a drain/source terminal coupled to the output of the boost voltage generator;

a discharging circuit coupled to a source/drain terminal of the first FET, wherein the discharging circuit is configured to discharge the output of the boost voltage generator via the first FET in response to a discharging signal becoming asserted; and a current injection circuit configured to generate and inject a current into the discharging circuit.

23. The apparatus of claim 22, wherein the current injection circuit is configured to generate the current based on a drain-to-source voltage of the first FET.

24. The apparatus of claim 22, wherein the discharging circuit is configured to generate a discharging current in response to the asserted discharging signal, and wherein the discharging current comprises a sum of a drain-to-source current of the first FET and the current generated by the current injection circuit.

25. The apparatus of claim 22, wherein the current injection circuit comprises a third FET including a drain/source terminal coupled to an upper voltage rail, a gate coupled to a drain/source terminal of the first FET, and a source/drain terminal coupled to a source/drain terminal of the first FET.

26. The apparatus of claim 22, further comprising a gate voltage boost circuit configured to generate a gate voltage for a gate of the first FET, wherein the gate voltage boost circuit is configured to boost the gate voltage in response to the asserted discharging signal.

27. A method of reducing a boost voltage at an output of a boost voltage generator, comprising:

discharging the output of the boost voltage generator via a first field effect transistor (FET) and a second FET in response to an asserted discharging signal applied to a gate of the second FET;

generating an injection current; and combining the injection current with a drain-to-source current of the first FET to form a discharging current through the second FET.

28. The method of claim 27, wherein generating the injection current comprises generating the injection current based on a drain-to-source voltage of the first FET.

29. A wireless communication device, comprising:

at least one antenna;

a transceiver coupled to the at least one antenna, wherein the transceiver comprises:

a voltage booster, comprising:

a boost voltage generator configured to generate a boost voltage at an output, a first field effect transistor (FET) including a drain/source terminal coupled to the output of the boost voltage generator, a discharging circuit coupled to a source/drain terminal of the first FET, wherein the discharging circuit is configured to discharge the output of the boost voltage generator via the first FET in response to a discharging signal becoming asserted, and a gate voltage boost circuit configured to generate a gate voltage for a gate of the first FET, wherein the gate voltage boost circuit is configured to generate the gate voltage at a boosted level in response to the asserted discharging signal; and an analog-to-digital converter (ADC) configured to use the boost voltage; and an integrated circuit (IC) including one or more signal processing cores coupled to the transceiver.

30. A wireless communication device, comprising:

at least one antenna;

a transceiver coupled to the at least one antenna, wherein the transceiver comprises:

a voltage booster, comprising:

a boost voltage generator configured to generate a boost voltage at an output, a first field effect transistor (FET) including a drain/source terminal coupled to the output of the boost voltage generator, a discharging circuit coupled to a source/drain terminal of the first FET, wherein the discharging circuit is configured to discharge the output of the boost voltage generator via the first FET in response to a discharging signal becoming asserted, and a current injection circuit configured to generate and inject a current into the discharging circuit, and an analog-to-digital converter (ADC) configured to use the boost voltage; and an integrated circuit (IC) including one or more signal processing cores coupled to the transceiver.

* * * * *